United States Patent
Oike et al.

(10) Patent No.: US 6,591,000 B1
(45) Date of Patent: Jul. 8, 2003

(54) APPARATUS AND METHOD FOR PREPROCESSING A PICKED-UP IMAGE, LANE MARK RECOGNIZING SYSTEM, RELATED VEHICLE TRAVELING CONTROL SYSTEM, AND RECORDING MEDIA

(75) Inventors: Tatsuya Oike, Okazaki (JP); Katsuhiko Hibino, Anjo (JP); Masayuki Imanishi, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/294,907

(22) Filed: Apr. 20, 1999

(30) Foreign Application Priority Data

Apr. 21, 1998 (JP) .......................... 10-110959
Feb. 15, 1999 (JP) .......................... 11-036428

(51) Int. Cl.$^7$ ................................ G06K 9/00
(52) U.S. Cl. ...................... 382/104; 701/10; 701/28; 340/907
(58) Field of Search ................ 382/100, 103, 382/104, 105, 106, 107, 274; 340/425.5, 468, 479, 435, 461, 905, 909, 917, 933, 943; 348/118, 119, 143, 148, 149; 701/10, 45, 46, 117, 119, 120; 286/734, 495

(56) References Cited

U.S. PATENT DOCUMENTS 6,038,496 A * 3/2000 Dobler et al. .................. 701/3
6,091,833 A * 7/2000 Yasui et al. .................. 382/104
6,212,287 B1 * 4/2001 Olivieri et al. ............. 382/104

FOREIGN PATENT DOCUMENTS

| JP | 3-194669 | 8/1991 |
| JP | 5-289743 | 11/1993 |
| JP | 7-239996 | 9/1995 |
| JP | 9-180090 | 7/1997 |

* cited by examiner

Primary Examiner—Bhavesh M. Mehta
Assistant Examiner—Abolfazl Tabatabai
(74) Attorney, Agent, or Firm—Harness, Dickey & Pierce, PLC

(57) ABSTRACT

An image filter 1 produces an emphasized output in response to a brightness change between a dark portion and a bright portion of a picked-up image, with a sign of the emphasized output reversing according to a transitional direction of the brightness change between the dark portion and the bright portion. An image filter 2 produces an output representing an angular momentum of respective pixels about a central pixel in a predetermined processing zone set on the picked-up image. The angular momentum is defined by vectorial quantities of pixel values. An image filter 3 produces an output representing an accumulative absolute value of the respective pixels in the predetermined processing zone. An output difference between the image filters 2 and 3 is obtained as an index representing a lane mark.

35 Claims, 22 Drawing Sheets

FIG. 4A
|  -1 | 0 | 1 |
| --- | --- | --- |
| -1 | 0 | 1 |
| -1 | 0 | 1 |
FIG. 4B
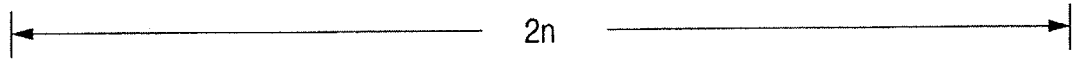
FIG. 4C
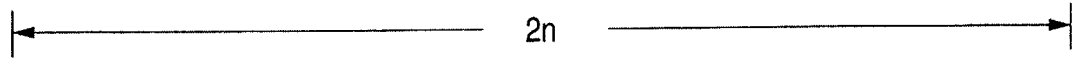
FIG. 4E
| 1 | 0 | -1 |
| --- | --- | --- |
| 1 | 0 | -1 |
| 1 | 0 | -1 |
FIG. 4F
| -1 | 1 |
| --- | --- |
| -1 | 1 |
| -1 | 1 |
FIG. 4G
| 1 | -1 |
| --- | --- |
| 1 | -1 |
| 1 | -1 |

FIG. 4H

| -1 | 0 | 0 | 1 |
|----|---|---|---|
| -1 | 0 | 0 | 1 |
| -1 | 0 | 0 | 1 |

FIG. 4I

| 1 | 0 | 0 | -1 |
|---|---|---|----|
| 1 | 0 | 0 | -1 |
| 1 | 0 | 0 | -1 |

FIG. 4K

| 1 | 1 | 1 | 1 | 1 | 1 | 1 | 1 | 1 | 1 | 0 | -1 | -1 | -1 | -1 | -1 | -1 | -1 | -1 | -1 | -1 |

$\longleftarrow 2n+1 \longrightarrow$

FIG. 4L

| 1 | 1 | 1 | 1 | 1 | 1 | 1 | 1 | 1 | 1 | 0 | 1 | 1 | 1 | 1 | 1 | 1 | 1 | 1 | 1 | 1 |

$\longleftarrow 2n+1 \longrightarrow$

FIG. 4M

| -1 | -1 | -1 | -1 | -1 | -1 | -1 | -1 | -1 | -1 | 0 | 1 | 1 | 1 | 1 | 1 | 1 | 1 | 1 | 1 | 1 |

$\longleftarrow 2n+1 \longrightarrow$

FIG. 4N

| -1 | -1 | -1 | -1 | -1 | -1 | -1 | -1 | -1 | -1 | 1 | 1 | 1 | 1 | 1 | 1 | 1 | 1 | 1 | 1 |

$\longleftarrow 2n \longrightarrow$

ORIGINAL PICTURE

PIXEL VALUE (BRIGHTNESS)

FILTER 1 PROCESSED VALUE
OUTPUT OF FILTER 1

FILTER 2 PROCESSED VALUE
OUTPUT OF FILTER 2

FILTER 3 PROCESSED VALUE
OUTPUT OF FILTER 3

DIFFERENTIAL VALUE

ORIGINAL PICTURE

PIXEL VALUE (BRIGHTNESS)

FILTER 1 PROCESSED VALUE

OUTPUT OF FILTER 1

FILTER 2 PROCESSED VALUE

OUTPUT OF FILTER 2

FILTER 3 PROCESSED VALUE

OUTPUT OF FILTER 3

DIFFERENTIAL VALUE

ORIGINAL PICTURE

ORIGINAL PICTURE

PIXEL VALUE (BRIGHTNESS)

FILTER 1 PROCESSED VALUE

OUTPUT OF FILTER 1

FILTER 2 PROCESSED VALUE

OUTPUT OF FILTER 2

FILTER 3 PROCESSED VALUE

OUTPUT OF FILTER 3

DIFFERENTIAL VALUE

FIG. 12A
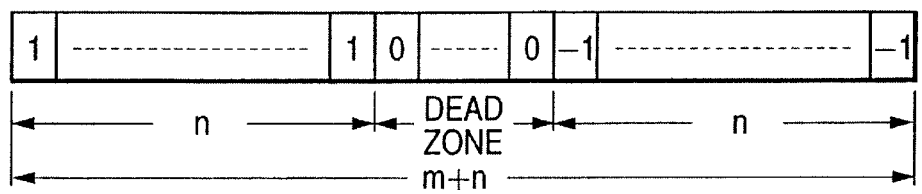
FIG. 12B
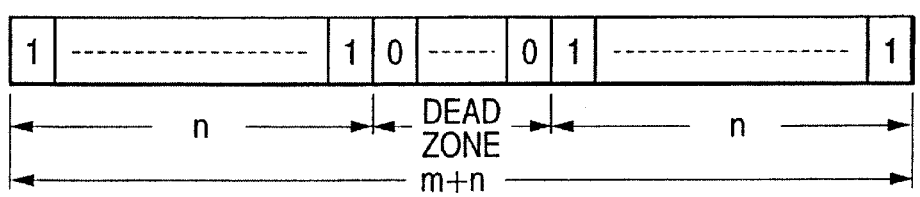
FIG. 13A
| -1 | -1 | 0 |  | 0 | 1 | 1 | 0 |  | 0 | 1 | 1 | 0 |  | 0 | -1 | -1 |
|----|----|---|---|---|---|---|---|---|---|---|---|---|---|---|----|----|
| -1 | -1 | 0 | ---- | 0 | 1 | 1 | 0 | -------- | 0 | 1 | 1 | 0 | ---- | 0 | -1 | -1 |
| -1 | -1 | 0 |  | 0 | 1 | 1 | 0 |  | 0 | 1 | 1 | 0 |  | 0 | -1 | -1 |
FIG. 13B
| -1 | -1 | 0 |  | 0 | 1 | 1 | 0 |  | 0 | -1 | -1 | 0 |  | 0 | 1 | 1 |
|----|----|---|---|---|---|---|---|---|---|----|----|---|---|---|---|---|
| -1 | -1 | 0 | ---- | 0 | 1 | 1 | 0 | -------- | 0 | -1 | -1 | 0 | ---- | 0 | 1 | 1 |
| -1 | -1 | 0 |  | 0 | 1 | 1 | 0 |  | 0 | -1 | -1 | 0 |  | 0 | 1 | 1 |

FIG. 17A ORIGINAL PICTURE 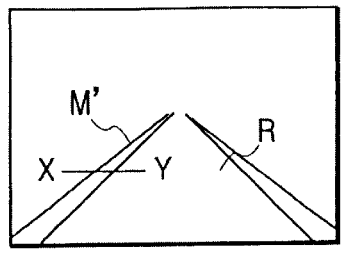
FIG. 17B PIXEL VALUE (BRIGHTNESS) 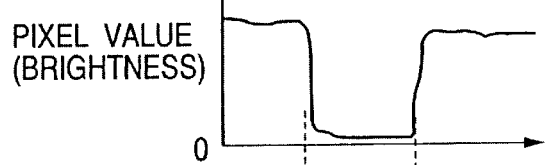
FIG. 17C FILTER 1 PROCESSED VALUE 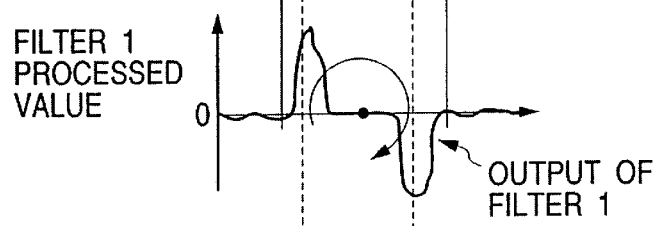
OUTPUT OF FILTER 1
FIG. 17D FILTER 2 PROCESSED VALUE 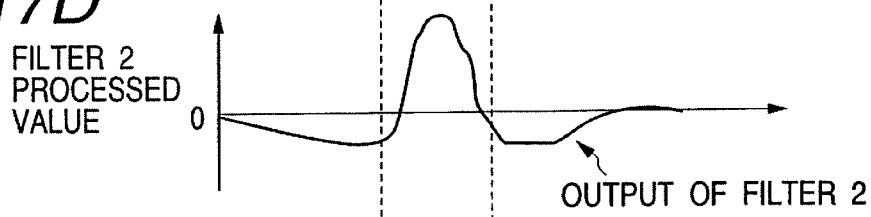
OUTPUT OF FILTER 2
FIG. 17E FILTER 3 PROCESSED VALUE 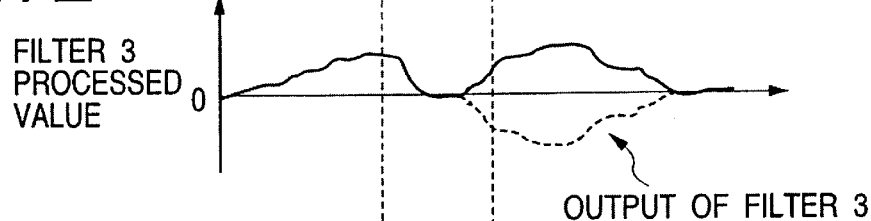
OUTPUT OF FILTER 3
FIG. 17F DIFFERENTIAL VALUE 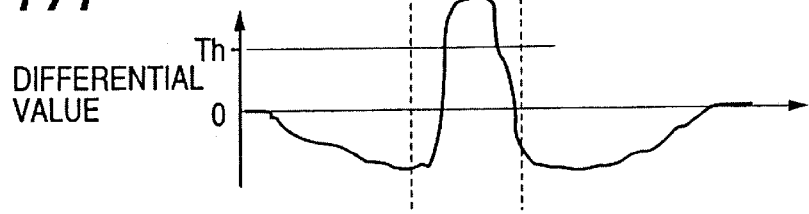

ORIGINAL PICTURE

PIXEL VALUE (BRIGHTNESS)

FILTER 1 PROCESSED VALUE
OUTPUT OF FILTER 1

FILTER 2 PROCESSED VALUE
OUTPUT OF FILTER 2

FILTER 3 PROCESSED VALUE
OUTPUT OF FILTER 3

DIFFERENTIAL VALUE

ORIGINAL PICTURE

PIXEL VALUE (BRIGHTNESS)

FILTER 1 PROCESSED VALUE
OUTPUT OF FILTER 1

FILTER 2 PROCESSED VALUE
OUTPUT OF FILTER 2

FILTER 3 PROCESSED VALUE
OUTPUT OF FILTER 3

DIFFERENTIAL VALUE

FIG. 20A
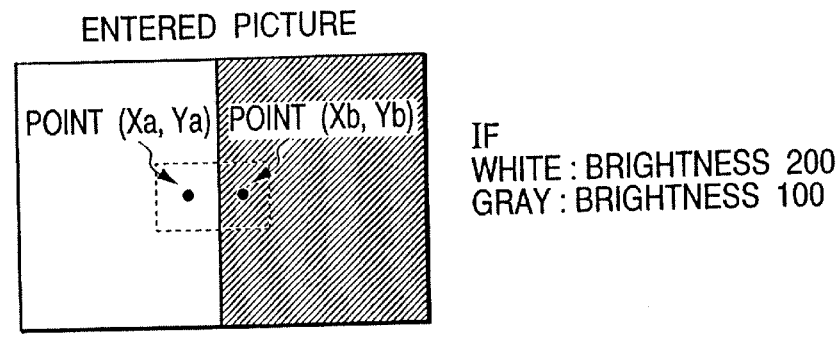
ENTERED PICTURE
IF
WHITE : BRIGHTNESS 200
GRAY : BRIGHTNESS 100
FIG. 20B  ↓ ENLARGED
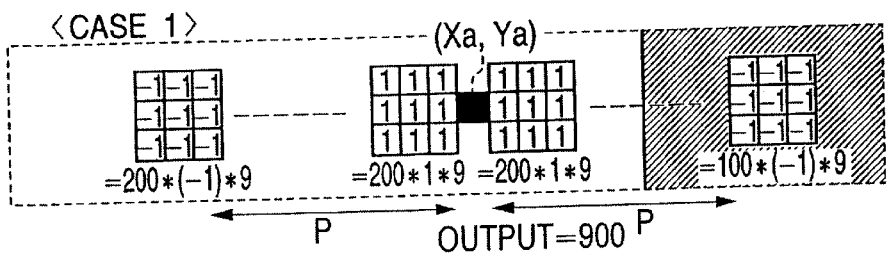
FIG. 20C
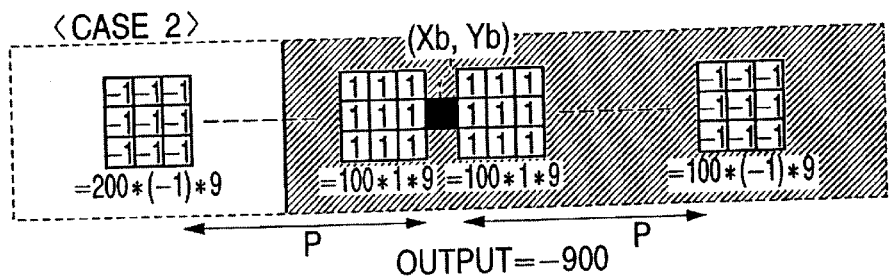
FIG. 20D
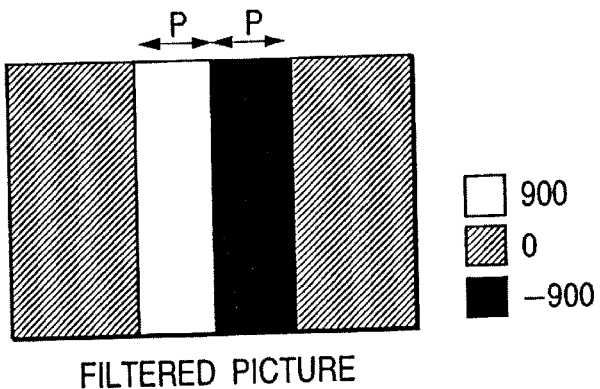
FILTERED PICTURE

APPARATUS AND METHOD FOR PREPROCESSING A PICKED-UP IMAGE, LANE MARK RECOGNIZING SYSTEM, RELATED VEHICLE TRAVELING CONTROL SYSTEM, AND RECORDING MEDIA

BACKGROUND OF THE INVENTION

The present invention relates to a lane mark recognizing system for recognizing a lane mark on a traveling road, and to a picked-up image preprocessing apparatus incorporated in this lane mark recognizing system. Furthermore, the present invention relates to a vehicle traveling control system for controlling the vehicle according to the lane mark recognized by the lane mark recognizing system, and to a recording medium storing a program for executing the preprocessing of the picked-up image in a computer system.

To realize an automatic driving of a vehicle, it is necessary to accurately recognize a traveling road ahead of the vehicle. According to a conventionally developed recognizing method, a lane mark is recognized from a picked-up image of the traveling road ahead of the vehicle. The lane mark color is generally white or yellow which is discriminable from gray or black of the road color. For example, the unexamined Japanese patent publication No. Kokai 5-289743 discloses a method for recognizing the lane mark based on binary-coded data of an original picture. The unexamined Japanese patent publication No. Kokai 7-239996 discloses a method for recognizing the lane mark based on binary-coded data resultant from the edging processing applied to an original picture.

However, the recognizing method disclosed in the unexamined Japanese patent publication No. Kokai 5-289743 is based on a discrimination of a bright portion (i.e., lane mark) from a dark portion (i.e., road). All of brightness change is thus detected as indicating the lane mark. In other words, this conventional recognizing method erroneously recognizes the bright portions other than the lane mark. To eliminate this problem, an appropriate postprocessing is required after obtaining the binary-coded data for removing the noise data corresponding to the bright portions other than the lane mark.

Similarly, the recognizing method disclosed in the unexamined Japanese patent publication No. Kokai 7-239996 requires a complicated postprocessing. For example, the picked-up image may include another vehicles traveling ahead of the subjective vehicle. In such a case, the edging processed data comprise the edge data corresponding to the preceding vehicles as well as the lane mark. Thus, the postprocessing is required to discriminate the edge of the lane mark from the edges of the preceding vehicles.

On the other hand, the unexamined Japanese patent publication No. Kokai 3-194669 discloses a lane mark detecting filter capable of emphasizing a bright region surrounded by a dark region. The likelihood of the lane mark is judged based on the output of the lane mark detecting filter. The noise data is then removed according to the likelihood judgement.

According to the unexamined Japanese patent publication No. Kokai 3-194669, the brightness distribution is monitored along a lateral direction crossing the lane mark on the picked-up image. The lane mark is generally brighter than the road. Thus, when the above-described lane mark detecting filter is applied to the picked-up image, a positive filtering output is produced in response to the bright portion. Generation of the filtering output according to this conventional system is explained in more detail with reference to FIGS. 20A to 20D.

It is now assumed that the left half of an input image is a white region (brightness=200) and the right half is a gray region (brightness=100), as shown in FIG. 20A.

The filtering output is obtained by applying the lane mark detecting filter with respect to an objective pixel (X, Y). The lane mark detecting filter has a plurality of filtering parameters arranged in a matrix pattern including a total of four matrixes each consisting of 3×3 pixels, with two matrixes (referred hereinafter to as "near-side matrixes") positioned next to both sides of the objective pixel and another two matrixes (referred hereinafter to as "far-side matrixes") positioned far from the both sides of the objective pixel. Each pixel has a positive pixel value (+1) in the two near-side matrixes. On the contrary, each pixel has a negative pixel value (−1) in the far-side matrixes.

FIG. 20B shows a case where an objective pixel (Xa, Ya) resides in the white region so that all of the two near-side matrixes and the left far-side matrix are involved in the while region. Only the right far-side matrix is involved in the gray region. In this case, each of the near-side matrix produces 200*1*9=1,800. The left far-side matrix produces 200*(−1)*9=−1,800. The right far-side matrix produces 100*(−1)*9=−900. Therefore, a summed-up filtering output becomes 1,800×2−1,800−900=900.

FIG. 20C shows another case where an objective pixel (Xb, Yb) resides in the gray region so that all of the two near-side matrixes and the right far-side matrix are involved in the gray region. Only the left far-side matrix is involved in the white region. In this case, each of the near-side matrix produces 100*1*9 =900. The right far-side matrix produces 100*(−1)*9=−900. The left far-side matrix produces 200*(−1)*9=−1,800. Therefore, a summed-up filtering output becomes 900×2−900−1,800=−900.

FIG. 20D shows a filtered picture processed by the above-described lane mark detecting filter. As apparent from FIG. 20D, the lane mark detecting filter produces a positive filtering output in any transition from the bright region to the gray region. Thus, the positive filtering output may be produced in response to an erroneous bright portion other than the lane mark. For example, if a specific portion is as bright as the lane mark, a filtering output produced in a transition from this erroneous brighter portion to the road is quite similar to and not discriminable from the filtering output produced in the transition from the true lane mark to the road. Furthermore, if the brightness of this erroneous bright portion is fairly larger than that of the lane mark, the lane mark may be undesirably neglected due to the brightness difference between them.

In other words, the lane mark recognizing method of the unexamined Japanese patent publication No. Kokai 3-194669 is only reliable in an ideal condition where the lane mark has a clear contrast against the road with no erroneous bright portions. If there is any erroneous bright portion in the input image, the erroneous data must be removed in the detection of the lane mark.

SUMMARY OF THE INVENTION

An object of the present invention is to provide a picked-up image preprocessing apparatus capable of discriminating a bright portion corresponding to the true lane mark from other erroneous bright portions, performing preprocessing for obtaining only the data of the true lane mark, and improving the processing efficiency in the lane mark recognition.

Another object of the present invention is to provide a method for preprocessing the picked-up image used in the lane mark recognition.

Another object of the present invention is to provide a lane mark recognizing system incorporating the picked-up image preprocessing apparatus.

Another object of the present invention is to provide a vehicle traveling control system for controlling a vehicle based on the recognition result of the lane mark recognizing system.

Another object of the present invention is to provide a recording medium storing a program of a computer system for executing the above-described preprocessing.

The picked-up image preprocessing apparatus of the present invention is preferably applicable to a lane mark recognizing system for recognizing a lane mark on a traveling road ahead of the vehicle based on a picked-up image of the traveling road. For example, a CCD camera is installed on a vehicle body. The preprocessing apparatus of the present invention is applied to the image picked up by the CCD camera. The lane mark recognition is performed based on the preprocessed image.

The picked-up image preprocessing is performed in the following manner.

The picked-up image is scanned to generate an emphasized output responsive to a brightness change between a dark portion and a bright portion of the picked-up image, with a sign of the emphasized output reversing according to a transitional direction of the brightness change between the dark portion and the bright portion.

A picture resultant from the emphasized output contains a lane feature quantity obtained in a predetermined processing zone set on the picked-up image. The processing zone has a size applicable to a plurality of pixels of the picked-up image with a width wider than the lane mark. The lane feature quantity corresponds to a difference between an angular momentum of respective pixels about a central pixel in the predetermined processing zone and an accumulative absolute value of the respective pixels in the predetermined processing zone. The angular momentum is defined by vectorial quantities of pixel values of the respective pixels relative to the central pixel.

The lane mark is usually a while or yellow line drawn on a road which is recognized as a bright portion on the picked-up image. On the contrary, the lane mark may be a dark portion, such as a black lane mark printed on a white floor of a factory. For example, an automatic guided vehicle travels along a dark-color lane mark on a bright color floor of the factory.

In view of the presence of various kinds of lane marks, the picked-up image preprocessing is performed differently in each case.

In a first case where the lane mark is a white or comparable bright color lane mark, the lane mark is recognized as a bright portion in the picked-up image. In this case, a positive emphasized output is generated when the brightness change occurs in a transition from the dark portion to the bright portion, and a negative emphasized output is generated when the brightness change occurs in an opposed transition from the bright portion to the dark portion. The angular momentum of the respective pixels is positive when the angular momentum is detected in a clockwise direction relative to the central pixel in the predetermined processing zone.

In a second case where the lane mark is a black or comparable dark color lane mark, the lane mark is recognized as a dark portion in the picked-up image. In this case, a positive emphasized output is generated when the brightness change occurs in a transition from the bright portion to the dark portion, and a negative emphasized output is generated when the brightness change occurs in a transition from the dark portion to the bright portion. The angular momentum of the respective pixels is positive when the angular momentum is detected in a clockwise direction relative to the central pixel in the predetermined processing zone.

In a third case where the lane mark is a black or comparable dark color lane mark, the lane mark is recognized as a dark portion in the picked-up image. In this case, a negative emphasized output is generated when the brightness change occurs in a transition from the bright portion to the dark portion, and a positive emphasized output is generated when the brightness change occurs in a transition from the dark portion to the bright portion. The angular momentum of the respective pixels is positive when the angular momentum is detected in a counterclockwise direction relative to the central pixel in the predetermined processing zone.

In a fourth case where the lane mark is a white or comparable bright color lane mark, the lane mark is recognized as a bright portion in the picked-up image. In this case, a negative emphasized output is generated when the brightness change occurs in a transition from the dark portion to the bright portion, and a positive emphasized output is generated when the brightness change occurs in an opposed transition from the bright portion to the dark portion. The angular momentum of the respective pixels is positive when the angular momentum is detected in a counterclockwise direction relative to the central pixel in the predetermined processing zone.

According to the present invention, the lane feature quantity is used to appropriately define the likelihood of the lane mark. The lane mark is characteristic in that there is a band region having a predetermined width. When seen on the filtered picture, the lane mark has both ends whose pixel values (e.g., brightness) are substantially the same in absolute value but are opposite in sign (i.e., +or −). Accordingly, when the vectorial consideration is applied to the pixel values, a significant angular momentum is caused about a central pixel of a predetermined processing zone including the lane mark. More specifically, when the central pixel is located between the both ends of the lane mark in the width direction, the brightness change occurs at opposed sides of the central pixel. The positive pixel and the negative pixel are positioned at the opposed sides of the central pixel. Accordingly, the angular momentum of the same direction is caused about the central pixel. A large angular momentum is thus produced about the center of the lane mark.

On the other hand, an erroneous bright portion will cause a single brightness change when it does not have a width similar to that of the lane mark. If the brightness of the erroneous bright portion is identical with that of the lane mark, an angular momentum resultant from the erroneous bright portion will be half of that resultant from the lane mark. Thus, according to the present invention, the erroneous bright portion is easily discriminable from the erroneous bright portion.

However, if the brightness of the erroneous bright portion is two times the brightness of the lane mark, the angular momentum resultant from the erroneous bright portion will be identical with the angular momentum resultant from the lane mark. In this case, it is difficult to discriminate the lane mark from the erroneous bright portion.

To eliminate such a problem, the picked-up image preprocessing of the present invention further comprises a step of obtaining the accumulative absolute value in the predetermined processing zone.

According to the true lane mark, the accumulative absolute value becomes 0 because the positive and negative pixel values at the both sides of the lane marks are canceled.

On the other hand, according to the erroneous bright portion, no cancellation of the pixel values is expected when only one brightness change occurs. In other words, the accumulative absolute value resultant from the erroneous bright portion is substantially identical with the angular momentum (i.e., the pixel value itself).

The present invention obtains the lane feature quantity corresponding to the difference between the angular momentum of respective pixels about the central pixel in the predetermined processing zone and the accumulative absolute value of the respective pixels in the predetermined processing zone. The lane feature quantity for the true lane mark is substantially identical with the angular momentum which is a relatively large value. The lane feature quantity for the erroneous bright portion is substantially 0. Thus, the present invention makes it possible to surely discriminate the lane mark from the erroneous bright portion.

The above-described explanation is based on the bright lane mark. However, there will be a case where the lane mark is darker than the road. In this case, the sign (i.e., positive and negative) of the pixel values will be reversed. The angular momentum causes in the opposed direction. The resultant lane feature quantity for the true lane mark is a large negative value which is sufficiently discriminable from 0 of the erroneous dark portion. Thus, even in such a case, the present invention makes it possible to surely discriminate the lane mark from the erroneous dark portion.

In short, the present invention produces the filtered picture based on the lane feature quantity corresponding to the difference between the angular momentum of respective pixels about the central pixel in the predetermined processing zone and the accumulative absolute value of the respective pixels in the predetermined processing zone. The true lane mark is discriminable from the erroneous brightness change portion by comparing their lane feature quantities. As a simple processing, it is effective to convert each lane feature quantity into a binary value with reference to an appropriate threshold. Through this processing, all of noise data is removed and the data of the true lane mark can be surely obtained. This realizes an accurate recognition in the succeeding lane mark recognizing processing, and also improves the processing efficiency.

As apparent from the foregoing description, the inventors of the present invention introduce the "angular momentum" as an appropriate physical quantity representing the features of the lane mark, knowing that the "angular momentum" is seldom used in the field of the signal processing. In general, the "angular momentum" is the cross product of a vector from a specified reference point to a particle, with the particle's linear momentum. The inventors of the present invention, however, carefully consider the fact that pixel values at the both ends of the lane mark image are opposite each other when observed in the brightness change appearing on the picked-up image. Such characteristic symmetrical disposition of the pixel values obtainable from the lane mark can be discriminated from a single brightness change inherent to the erroneous bright or dark portion. Thus, the inventors takes an approach to express the characteristics of the lane mark by the vectorial quantity quite similar to the angular momentum based on the positive and negative pixel values at both sides of the lane mark. In this respect, the inventors believe that the "angular momentum" is an appropriate physical quantity to express the features of the lane mark observed in the brightness change in the picked-up image.

The width of the lane mark is not always constant. A picked-up image may contain a plurality of lane marks different in width. A specific lane mark, for example drawn at a branch or merging portion, may be thicker than an ordinary lane mark. The width of the lane mark may be intentionally differentiated to discriminate one from another. For example, a plurality of paths are prepared on the floor of the factory using the automatic guided vehicle. In such a case, it is preferable to eliminate all of unnecessary lane marks.

A preferable embodiment of the present invention provides a dead zone with a predetermined width at the center of the predetermined processing zone so that the angular momentum and the accumulative absolute value are not obtained from this dead zone.

Providing this dead zone makes it possible to completely remove any lane mark narrower than the dead zone, because the brightness change occurring at both ends of the narrower lane mark cannot be sensed simultaneously by the processing zone with the center dead zone. In other words, the detectable lane marks can be substantially limited to the lane marks wider than the dead zone and narrower than the predetermined processing zone.

The camera of the lane mark recognizing apparatus is located at a predetermined altitudinal position of the vehicle which is generally higher than the road surface by a distance up to 2 meters. The camera can image-pick up a road view ahead of the vehicle according to the perspective representation. When a road having a constant width is image picked up by this camera, the road width on the picked-up image is wider in the lower region (i.e., at the near side) and narrower in the upper region (i.e., at the far side) due to the perspective representation.

Accordingly, the preferable embodiment of the present invention adjusts the predetermined processing zone so as to have a width widened at a lower side (i.e., near side) of the picked-up image and narrowed at an upper side (i.e., far side) of the picked-up image. With this adjustment, it becomes possible to change the width of the processing zone according to the perspective representation of the picked-up image. Similarly, it is preferable to adjust the dead zone so as to have a width widened at the lower side (i.e., near side) of the picked-up image and narrowed at the upper side (i.e., far side) of the picked-up image. With this adjustment, it becomes possible to change the width of the dead zone according to the perspective representation of the picked-up image.

More specifically, it is preferable that the width of the predetermined processing zone or the dead zone is determined based on a perspective transformation applied to the picked-up image.

In actual setting of the camera angle, the horizon is position at an altitudinal height spaced from the top by a predetermined vertical distance equivalent to ⅓ of the overall vertical length of the picked-up image. In this case, no road and no lane mark exists in the upper one-third region of the picked-up image. Therefore, it is preferable to set the width of the predetermined processing zone to zero at a predetermined upper region of the picked-up image where no lane mark is present. With this setting, it becomes possible to effectively eliminate unnecessary image processing.

According to the preferable embodiment of the present invention, the predetermined upper region including no lane mark is regarded as a region higher than an infinite position of the lane mark on the picked-up image.

According to the preferable embodiment of the present invention, to realize a simplified picked-up image processing, the predetermined processing zone extends in a horizontal direction of the picked-up image since the image processing is generally performed with reference to the horizontal direction and the vertical direction.

Especially, the lane mark on the picked-up image extends in the up-and-down direction although shown by the perspective representation. Thus, the horizontal processing zone crosses perpendicularly to the lane mark. This is preferable for effectively and accurately performing the picked-up image preprocessing to detect the lane mark.

However, the road does not always extend straight forward and flexibly changes its curvature according to the environmental conditions. If the vehicle is traveling on a curved road, the lane mark may extend in the horizontal direction rather than in the vertical direction on the picked-up image. In this respect, it is preferable that the predetermined processing zone is extendable in a vertical direction of the picked-up image as well as in the horizontal direction of the picked-up image.

In short, it is preferable that the predetermined processing zone is set along a direction normal to the lane mark on the picked-up image.

In this case, it may be possible to determine an optimum setting (e.g., optimum angle setting) of the predetermined processing zone based on each input picked-up image. However, this method requires a great amount of computations and takes a long time to process the picked-up image.

However, the picked-up image of the road and the lane mark does not cause a sudden and steep change. The present lane mark position is almost identical with or very close to the previously detected position. In view of the foregoing, to simplify the picked-up image preprocessing and reduce the substantial time and cost in this preprocessing, the preferable embodiment of the present invention sets the predetermined processing zone based on a previously detected lane mark position in the lane mark recognizing apparatus with which the picked-up image preprocessing apparatus is incorporated.

As described above, the present invention introduces the "angular momentum" as an appropriate physical quantity representing the features of the lane mark, knowing that the "angular momentum" is seldom used in the field of the signal processing. The inventors of the present invention, however, carefully consider the fact that pixel values at the both ends of the lane mark image are opposite each other when observed in the brightness change appearing on the picked-up image. Such characteristic symmetrical disposition of the pixel values obtainable from the lane mark can be discriminated from a single brightness change inherent to the erroneous bright or dark portion. Thus, the inventors takes the approach to express the characteristics of the lane mark by the vectorial quantity quite similar to the angular momentum based on the positive and negative pixel values at both sides of the lane mark. In this respect, the inventors believe that the "angular momentum" is an appropriate physical quantity to express the features of the lane mark observed in the brightness change in the picked-up image.

To express the above-described inventive approach in a different way, another aspect of the present invention provides a picked-up image preprocessing apparatus for applying predetermined preprocessing to a picked-up image of a traveling road ahead of a vehicle and installable in a lane mark recognizing apparatus for recognizing a lane mark on the traveling road based on the picked-up image. The picked-up image preprocessing apparatus comprises an image emphasizing means for scanning the picked-up image and generating an emphasized output responsive to a brightness change between a dark portion and a bright portion of the picked-up image, with a sign of the emphasized output reversing according to a transitional direction of the brightness change between the dark portion and the bright portion. An image output means is provided for producing a picture resultant from the emphasized output of the image emphasizing means. The picture contains a lane feature quantity obtained in a predetermined processing zone set on the picked-up image. The processing zone has a size applicable to a plurality of pixels of the picked-up image with a width wider than the lane mark. The image output means comprises a lane feature detecting means for detecting a symmetrical disposition of positive and negative pixel values of respective pixels about a central pixel in the predetermined processing zone, and an absolute value detecting means for obtaining an accumulative absolute value of the respective pixels in the predetermined processing zone. The image output means is for obtaining the lane feature quantity as an output difference between the lane feature detecting means and the absolute value detecting means.

Preferably, the above-described picked-up image preprocessing apparatus can be incorporated in a lane mark recognizing system so that the lane mark recognizing system can recognize the lane mark based on the lane feature quantity obtained by the image output means of the picked-up image preprocessing apparatus.

Furthermore, it is preferable to incorporate the picked-up image preprocessing apparatus and the lane mark recognizing apparatus into a vehicle traveling control system so that the vehicle traveling control system can control the traveling of the vehicle according to the lane mark recognized by the lane mark recognizing apparatus.

The present invention is not limited to the (white or yellow) lane mark on a general road and therefore can be applied to various guide lines printed on the floor of a factory using an automatic guided vehicle. The road defined in this invention includes this kinds of paths provided on the factory floor.

Furthermore, it is preferable to store the above-described preprocessing as a program of a computer system. The program can be stored in a portable or handy recording medium, such as a floppy disk, a MO (magneto-optical) disk, a CD-ROM, a DVD (i.e. digital versatile disk), and a hard disk. Moreover, the program can be stored in a ROM or a backup RAM which is incorporated beforehand in a computer system.

According to the preferable embodiment of the present invention, there is a first image filter having filtering parameters arranged in a matrix pattern applicable to a plurality of pixels on the picked-up image. The first image filter produces an emphasized output responsive to a brightness change between a dark portion and a bright portion of the picked-up image, with a sign of the emphasized output reversing according to a transitional direction of the brightness change between the dark portion and the bright portion. There is a second image filter having filtering parameters having a predetermined processing zone applicable to a plurality of pixels on the picked-up image. The second image filter produces an output representing an angular momentum of respective pixels about a central pixel of the predetermined processing zone. The angular momentum is defined by vectorial quantities of pixel values of the respective pixels relative to the central pixel. There is a third image filter having filtering parameters having a predetermined processing zone applicable to a plurality of pixels on the picked-up image. The third image filter produces an output representing an accumulative absolute value of respective pixels about a central pixel of the predetermined processing zone. The lane feature quantity is detected as a difference between the output of the second image filter and the output of the third image filter.

The first image filter and the second image filter can be replaced by a composite filter capable of producing the equivalent output. Similarly, the first image filter and the third image filter can be replaced by a composite filter having the equivalent output.

According to the preferable embodiment of the present invention, the preprocessing of the picked-up image is performed according to the following steps. In a first step, an emphasized output is generated in response to a brightness change between a dark portion and a bright portion of the picked-up image with a sign of the emphasized output reversing according to a transitional direction of the brightness change between the dark portion and the bright portion. In the next step, a predetermined processing zone is set on the picked-up image. The processing zone has a size applicable to a plurality of pixels of the picked-up image with a width wider than the lane mark. An angular momentum of respective pixels is obtained about a central pixel in the predetermined processing zone. The angular momentum is defined by vectorial quantities of pixel values of the respective pixels relative to the central pixel. An accumulative absolute value of the respective pixels is obtained in the predetermined processing zone. Then, in the next step, a lane feature quantity is obtained as a difference between the angular momentum and the accumulative absolute value of the respective pixels. A picture containing the lane feature quantity is thus produced.

For example, the first image filter is applied to the picked-up image for producing the emphasized output. The second image filter is applied to the emphasized output of the first image filter for producing the output representing the angular momentum of respective pixels. The third image filter is applied to the emphasized output of the first image filter for producing the output representing the accumulative absolute value of respective pixels.

BRIEF DESCRIPTION OF THE DRAWINGS

The above and other objects, features and advantages of the present invention will become more apparent from the following detailed description which is to be read in conjunction with the accompanying drawings, in which:

FIG. 4A is a view showing an example of an image filter 1 used in the preferred embodiment of the present invention;

FIG. 4B is a view showing an example of an image filter 2 used in the preferred embodiment of the present invention;

FIG. 4C is a view showing an example of an image filter 3 used in the preferred embodiment of the present invention;

FIGS. 4E to 4I are views showing another examples of the image filter 1 used in the preferred embodiment of the present invention;

FIG. 4K is a view showing another example of the image filter 2 used in the preferred embodiment of the present invention;

FIG. 4L is a view showing another example of the image filter 3 used in the preferred embodiment of the present invention;

FIGS. 4M and 4N are views showing another examples of the image filter used in the preferred embodiment of the present invention;

FIG. 12A is a view showing an example of the image filter 2 with the dead zone in accordance with the preferred embodiment of the present invention;

FIG. 12B is a view showing an example of the image filter 3 with the dead zone in accordance with the preferred embodiment of the present invention;

FIG. 13A is a view showing another example of the composite filter of the image filter 1+the image filter 2 used in the preferred embodiment of the present invention;

FIG. 13B is a view showing another example of the composite filter of the image filter 1+the image filter 3 used in the preferred embodiment of the present invention;

FIGS. 17A to 17F are an original picture and graphs illustrating a filtering procedure using the image filters 1 to 3 to detect a dark lane mark (true mark) in accordance with the preferred embodiment of the present invention;

FIGS. 20A to 20D are views illustrating a conventional image filtering operation.

DESCRIPTION OF THE PREFERRED EMBODIMENT

Figure 1:
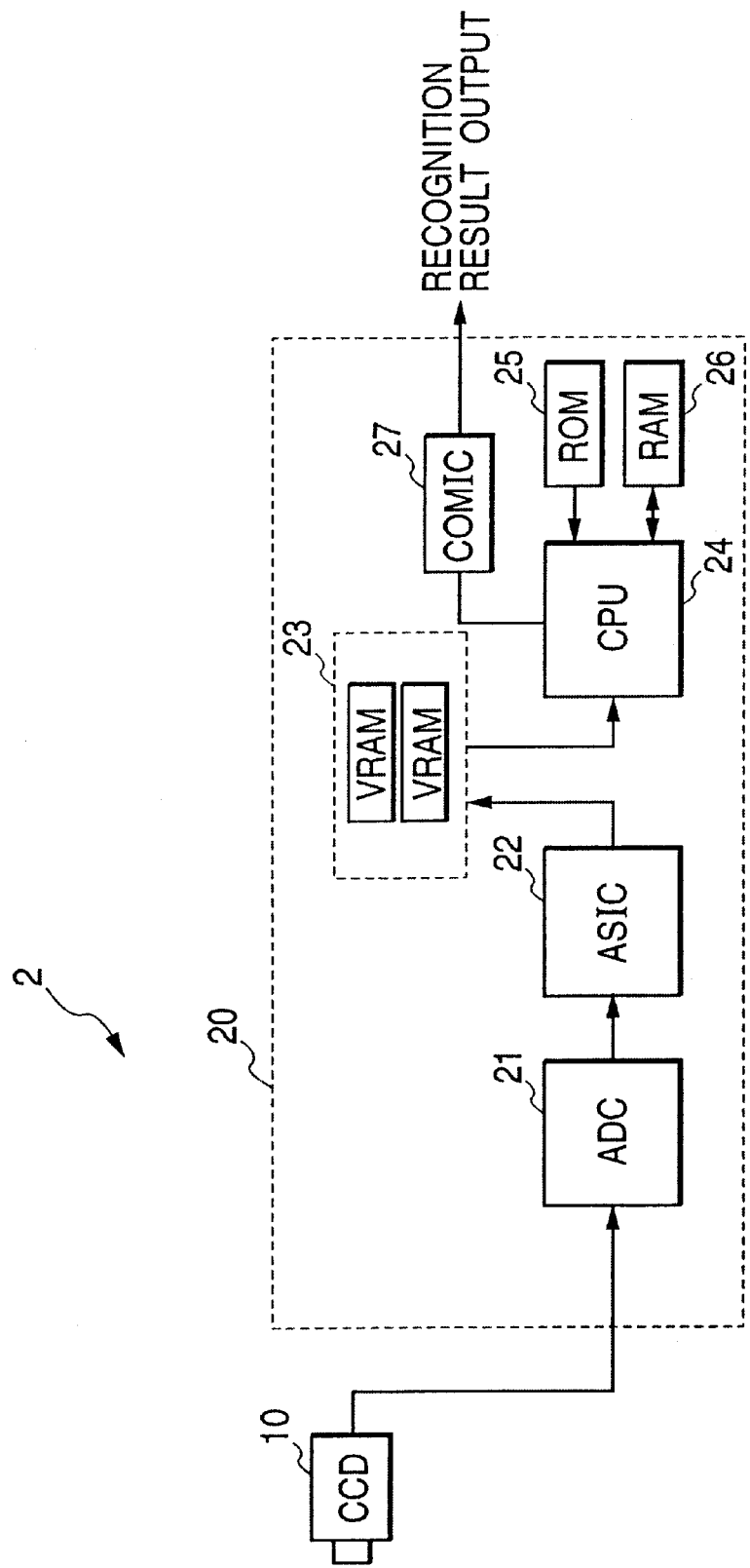
FIG. 1 is a block diagram showing a schematic arrangement of a CCD camera and a lane mark recognizing apparatus in accordance with a preferred embodiment of the present invention.

A preferred embodiment of the present invention will be explained hereinafter with reference to attached drawings. Identical parts are denoted by the same reference numerals throughout the views.

A lane mark recognizing apparatus 2 of the preferred embodiment is installed on a vehicle and used to recognizing a lane mark on a road ahead of the vehicle. The lane mark on the road indicates a traveling route or path along which the vehicle travels. For example, an automatic traveling control of the vehicle is performed based on a recognized lane mark.

Figure 2:
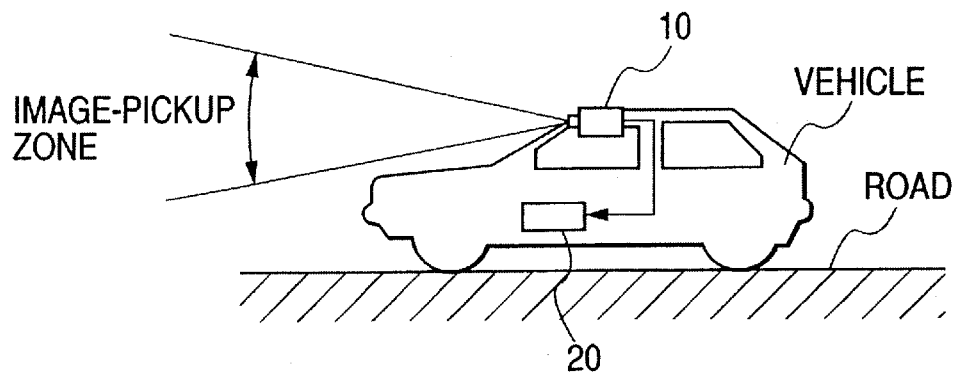
FIG. 2 is a side view showing a vehicle equipped with the CCD camera and the lane mark recognizing apparatus shown in FIG. 1.

The lane mark recognizing apparatus 2 comprises a CCD (Charge Coupled Device) camera 10 and a recognition processing section 20. As shown in FIG. 2, the CCD camera 10 is installed on the vehicle body, such as a ceiling of a passenger compartment above a driver's seat, to take a picture of a traveling road ahead of the vehicle. The camera angle is set to mainly include the traveling road extending from the front side of the vehicle to a predetermined distance away from the vehicle.

As shown in FIG. 1, the recognition processing section 20 comprises an analog/digital converter (ADC) 21, a preprocessing circuit (ASIC) 22, a video memory (VRAM) 23, a controller (CPU) 24, a ROM 25, a RAM 26, and a communication IC (COMIC) 27. More specifically, the analog/digital converter (ADC) 21 converts an analog video signal picked up by the CCD camera 10 into a digital video signal. The ASIC 22 applies predetermined preprocessing to the video data obtained from the ADC 21. The video memory 23 temporarily stores the preprocessed video data produced from the ASIC 22. The CPU 24 executes predetermined processing for recognizing the lane mark based on the video data stored in the video memory 23. The ROM 25 stores a program to be executed in the CPU 24. The RAM 26 serves as a working space for the CPU 24. The communication IC 27 receives the recognition result of the lane mark transmitted from the CPU 24 and sends out it to an external device.

Figure 3:
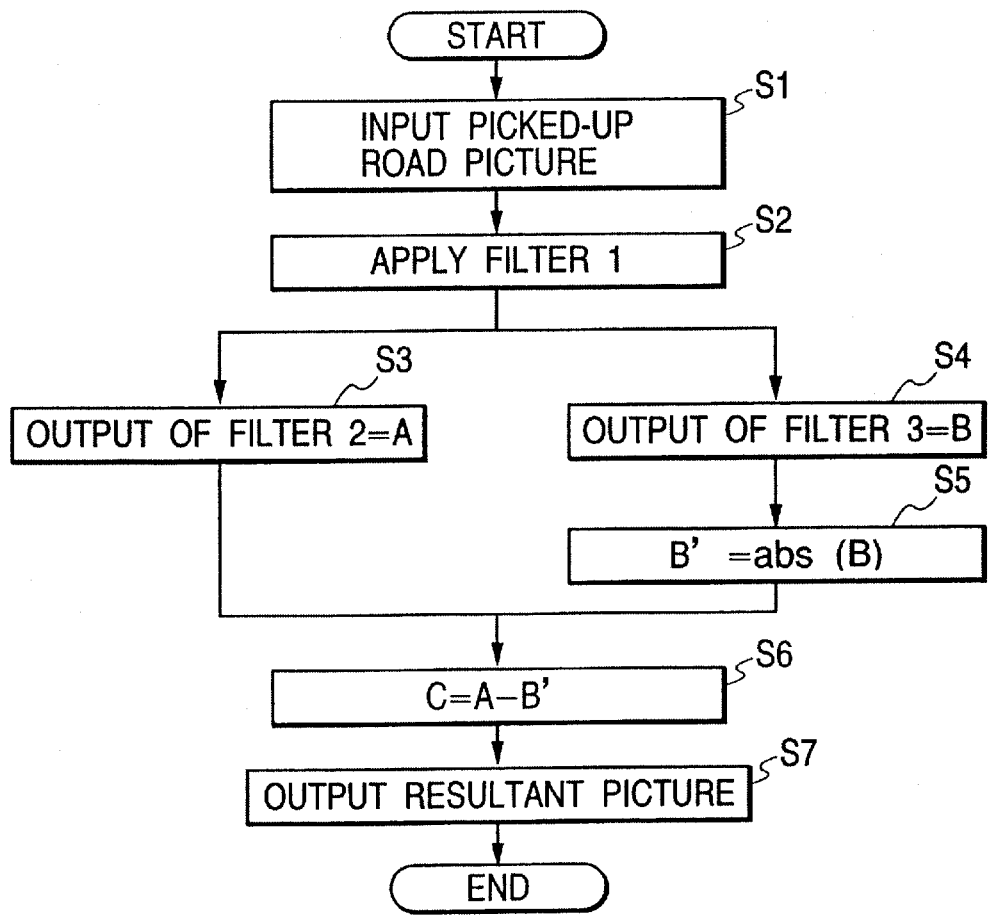
FIG. 3 is a flowchart schematically showing the preprocessing performed in the preferred embodiment of the present invention.

FIG. 3 is a flowchart showing the preprocessing performed in the ASIC 22.

First, in a step S1, the picked-up road picture is input to the ASIC 22 via the ADC 21 from the CCD camera 10. In the next step S2, an image filter 1 is applied to the picked-up image. As shown in FIG. 4A, the image filter 1 is a matrix filtering operator (or a filter operator, or a spatial filter) consisting of filtering parameters of 3 lines and 3 rows applicable to 3×3 pixels on the picked-up image. Each line of the filtering parameters consists of "−1, 0, 1".

Figure 4D:
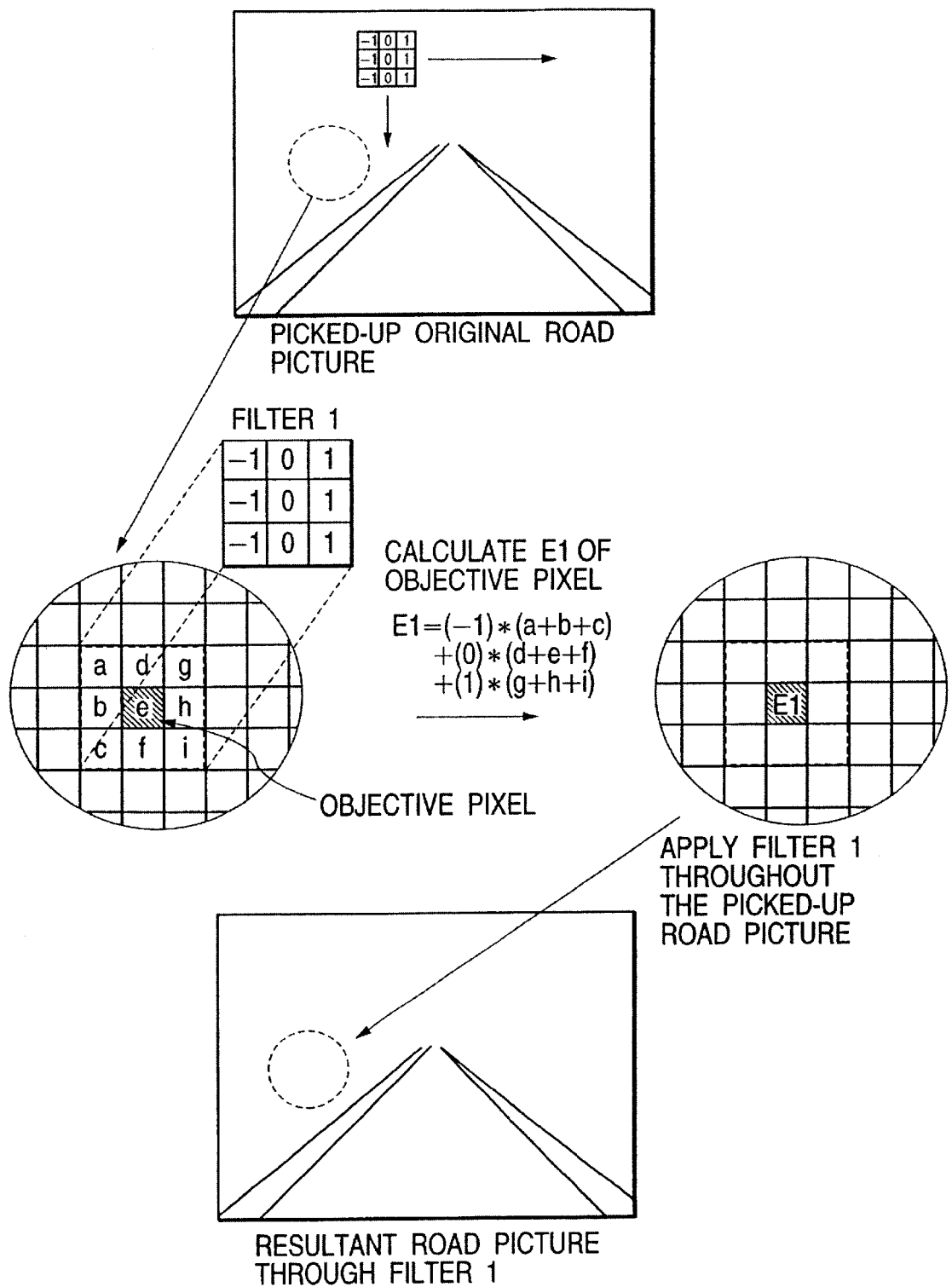
FIG. 4D is a view illustrating an application of the image filter 1 to a picked-up image of a traveling road in accordance with the preferred embodiment of the present invention.

As shown in FIG. 4D, the image filter 1 is thoroughly shifted from left to right in the right-and-left direction as well as from top to bottom in the up-and-down direction. Thus, the image filter 1 is applied to the entire region of the picked-up image.

In each shift position, the image filter 1 is applied to 3×3 pixels including a central objective pixel. A filtering output "E1" of the image filter 1, at this moment, is obtained as a sum of products of respective pixel values and corresponding filtering parameters.

The following equation is used to calculate the filtering output E1.

$$E1=(-1)*(a+b+c)+(0)*(d+e+f)+(1)*(g+h+i)=-a-b-c+g+h+i \qquad (1)$$

when a, b, c, d, e, f, g, h and i represent pixel values (i.e., brightness values) of the pixels to which the image filter 1 is applied.

The filtering output E1 of each objective pixel is thus obtained by successively shifting the image filter 1 focusing at the objective pixel in the right-and-left direction and in the up-and-down direction.

The image filter 1 functions as a means for detecting a brightness change between neighboring pixels (i.e., a difference between two pixel values). When the image filter 1 is positioned on a bright portion consisting of pixels having the same brightness, the filtering output E1 becomes 0. In the same manner, the filtering output E1 becomes 0 when the image filter 1 is positioned on a dark portion. However, when the image filter 1 is positioned on or near the boundary between the bright portion and the dark portion, the filtering output E1 becomes a significant value.

For example, the filtering output E1 becomes a negative value (E1=−300) at the boundary corresponding to a transition from the bright portion (a, b, c=200) to the dark portion (g, h, i=100). On the contrary, the filtering output E1 becomes a positive value (E1=+300) at the boundary corresponding to a transition from the dark portion (a, b, c=100) to the bright portion (g, h, i=200). In other words, the image filter 1 can detect not only the bright change at the boundary between the bright and dark portions but also the transitional direction from the bright portion to the dark portion or vice versa.

FIG. 4E is another embodiment of the image filter 1 which functions in the same manner as the example shown in FIG. 4A, although the filtering output is reversed due to the opposed arrangement of the filtering parameters, i.e., "1, 0, −1".

The image filter 1 may be a narrowed matrix filtering operator consisting of filtering parameters of 3 lines and 2 rows as shown in FIG. 4F or 4G, when the quality of the picked-up image is sharp and therefore a steep change is observed in the brightness change.

Alternatively, the image filter 1 may be a widened matrix filtering operator consisting of filtering parameters of 3 lines and 4 rows as shown in FIG. 4H or 4I, when the quality of the picked-up image is not sharp and therefore a dull change is observed in the brightness change.

Anyway, the matrix size of the image filter 1 should be determined by considering the accuracy or stability in the detection and the complicatedness in processing time or costs.

Next, in a step S3, an image filter 2 is applied to the output of the image filter 1. As shown in FIG. 4B, the image filter 2 is another matrix filtering operator (or a filter operator, or a spatial filter) consisting of filtering parameters of 1 line and 2n rows applicable to 1×2n pixels on the picked-up image. More specifically, the image filter 2 consists of n positive filtering parameters (+1) and n negative filtering parameters (−1) arrayed in the right and left direction in this order, i.e., "1, - - - , 1, −1, - - - 1." FIG. 4B shows one example of the image filter 2 corresponding to n=10.

Figure 4J:
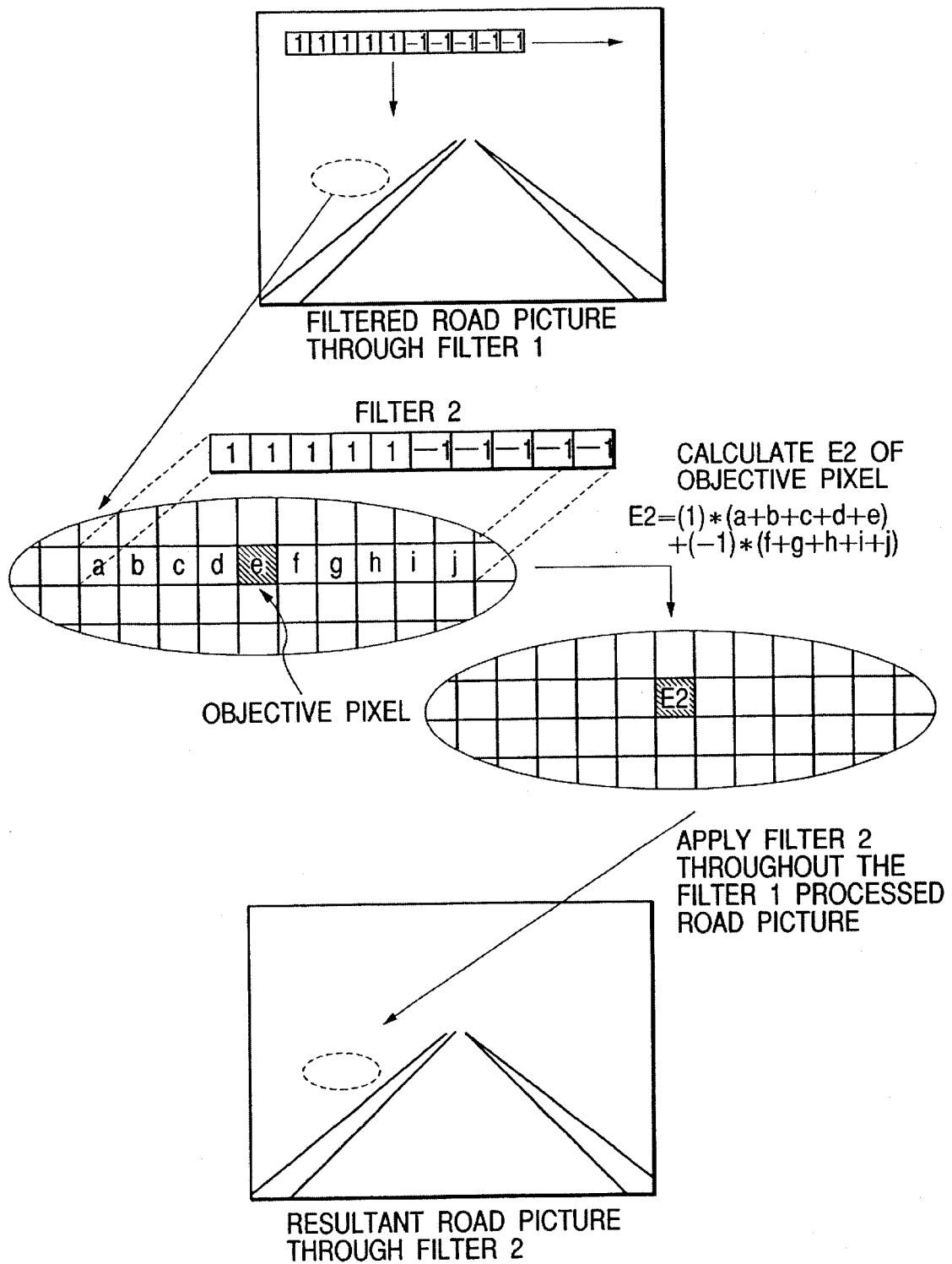
FIG. 4J is a view illustrating an application of the image filter 2 to the picked-up image of the traveling road in accordance with the preferred embodiment of the present invention.

As shown in FIG. 4J, the image filter 2 (n=5 in this case for simplification) is thoroughly shifted from left to right in the right-and-left direction as well as from top to bottom in the up-and-down direction. Thus, the image filter 2 is applied to the entire region of the picked-up image.

In each shift position, the image filter 2 is applied to 1×2n pixels including the central objective pixel. A filtering output "E2" of the image filter 2, at this moment, is obtained as a sum of products of respective pixel values and corresponding filtering parameters.

The following equation is used to calculate the filtering output E2.

$$E2=(1)*(a+b+c+d+e)+(-1)*(f+g+h+i+j)= -a-b-c-d-e+f+g+h+i+j \quad (2)$$

when a, b, c, d, e, f, g, h, i and j represent pixel values (i.e., brightness values) of the pixels to which the image filter 2 is applied.

The filtering output E2 of each objective pixel is thus obtained by successively shifting the image filter 2 focusing at the objective pixel in the right-and-left direction and in the up-and-down direction.

The image filter 2 functions as a means for obtaining an angular momentum of the brightness change about the objective pixel. When the image filter 2 is positioned in a region consisting of pixels having the same filtering output E1, the filtering output E2 becomes 0. However, when the image filter 2 is positioned in a region including pixels having opposed (i.e., positive and negative) pixel values, the filtering output E2 becomes a significant value.

For example, the filtering output E2 becomes a positive value (E2=600) when the filtering output E1 is a=+300, b, - - - , i=0, j=−300. When the filtering output E2 is a positive value, the angular momentum is caused in the clockwise direction.

The step S3 thus obtains an output "A" by applying the image filter 2 to the filtering output of the image filter 1.

Figure 5A:
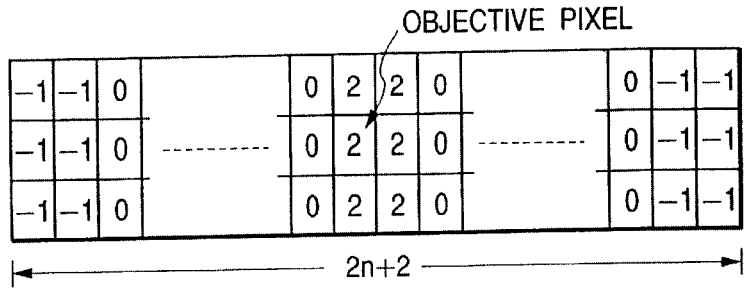
FIG. 5A is a view showing an example of a composite filter equivalent to a convolutional output of the image filter 1+the image filter 2 used in the preferred embodiment of the present invention.

FIG. 5A shows a matrix arrangement of a composite filter equivalent to a convolutional output of the image filter 1+the image filter 2. In FIG. 5A, dotted lines indicate there is no filtering parameters (i.e., 0) to be applied to or multiplied with the pixel values.

Next, in a step S4, an image filter 3 is applied to the output of the image filter 1. As shown in FIG. 4C, the image filter 3 is a matrix filtering operator (or a filter operator, or a spatial filter) consisting of filtering parameters of 1 line and 2n rows applicable to 1×2n pixels on the picked-up image. More specifically, the image filter 3 consists of positive filtering parameters only, i.e., "1, - - - , 1" FIG. 4C shows one example of the image filter 3 corresponding to n=10.

Like the image filter 2, the image filter 3 is applied to the entire region of the picked-up image by thoroughly shifting the image filter 3 from left to right in the right-and-left direction as well as from top to bottom in the up-and-down direction.

More specifically, the image filter 3 is applied to 1×2n pixels including a central objective pixel. A filtering output "E3" of the image filter 3, at this moment, is obtained as a sum of products of respective pixel values and corresponding filtering parameters.

The following equation is used to calculate the filtering output E3.

$$E3=(1)*(a+b+c+d+e+f+g+h+i+j)=+a+b+c+d+e+f+g+h+i+j \quad (3)$$

when a, b, c, d, e, f, g, h, i and j represent pixel values (i.e., brightness values) of the pixels to which the image filter 3 is applied.

The filtering output E3 is thus obtained by successively shifting the image filter 3 including the central objective pixel in the right-and-left direction and in the up-and-down direction.

The image filter 3 functions as a means for obtaining an accumulative value of the pixel values (i.e. brightness).

For example, the filtering output E3 becomes zero (E3=0) when the filtering output E1 is a=+300, b, - - - , i=0, j=−300.

The step S4 thus obtains an output "B" by applying the image filter 3 to the filtering output of the image filter 1. Subsequently, a step S5 obtains an absolute value B' of the output "B" (i.e., B'=abs (B)).

Figure 5B:
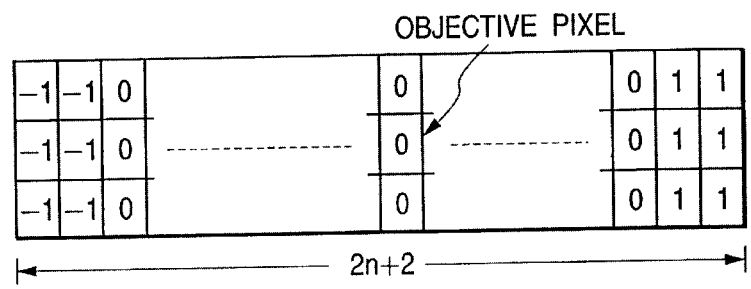
FIG. 5B is a view showing an example of a composite filter equivalent to a convolutional output of the image filter 1+the image filter 3 used in the preferred embodiment of the present invention.

FIG. 5B shows a matrix arrangement of a composite filter equivalent to a convolutional output of the image filter 1+the image filter 3. In FIG. 5B, dotted lines indicate there is no filtering parameters (i.e., 0) to be applied to or multiplied with the pixel values.

The image filter 2 and the image filter 3 can be modified variously. FIG. 4K is another example of the image filter 2 which functions in the same manner as the example shown in FIG. 4B, although the total number of the filtering parameters is increased to 2n+1 and a central pixel value is 0. FIG. 4L is another embodiment of the image filter 3 which functions in the same manner as the example shown in FIG. 4C, although the total number of the filtering parameters is increased to 2n+1 and a central pixel value is 0.

It is also possible to add the line number of the image filters 2 and 3 if necessary.

The image filter 2 may have opposed filtering parameters as shown in FIG. 4M.

Anyway, the matrix size of the image filters 2 and 3 should be optimized by considering the accuracy or stability in the detection and the complicatedness in processing time or costs.

Hereinafter, the composite filters shown in FIGS. 5A and 5B will be explained in more detail.

The picked-up image consists of a plurality of pixels having pixel values aij (i=1,2, - - - , j=1,2, - - - ).

When the image filter 1 is applied to the 3×3 pixel region including a central objective pixel (pixel value=aij), the filtering output oij of the objective pixel is expressed by the following equation (4).

$$o_{ij}=(-1)*(a_{i-1j-1}+a_{ij-1}+a_{i+1j-1})+(1)*(a_{i-1j+1}+a_{ij+1}+a_{i+1j+1}) \quad (4)$$

First, the calculation of the filtering output of the image filter 2 is explained. The image filter 2 is applied to the picture being filtered by the image filter 1.

Figure 5C:
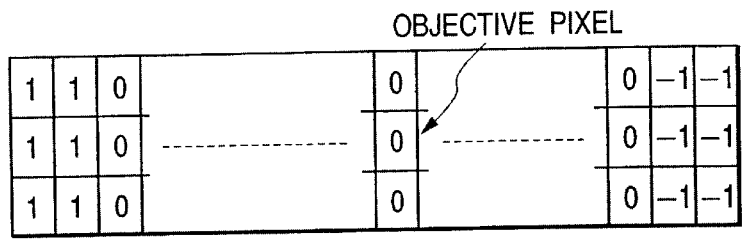
FIG. 5C is a view showing another example of the composite filter of the image filter 1+the image filter 3 used in the preferred embodiment of the present invention.
Figure 5D:
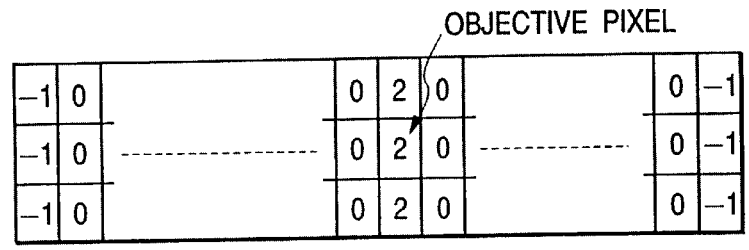
FIG. 5D is a view showing another example of the composite filter of the image filter 1+the image filter 2 used in the preferred embodiment of the present invention.
Figure 5E:
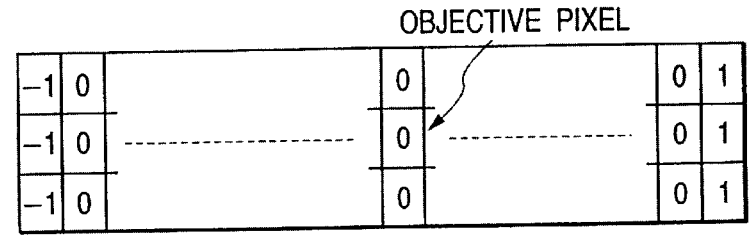
FIG. 5E is a view showing another example of the composite filter of the image filter 1+the image filter 3 used in the preferred embodiment of the present invention.
Figure 5F:
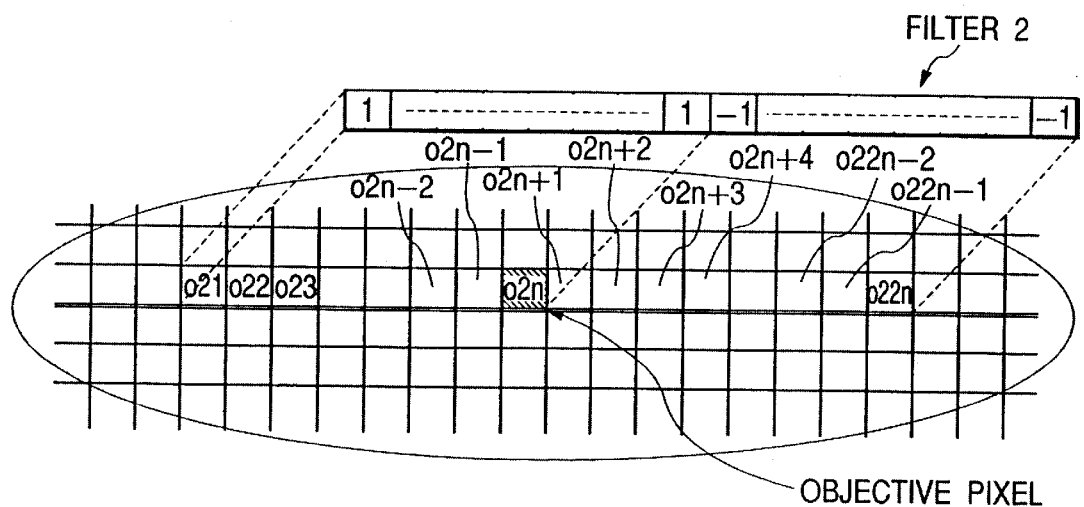
FIG. 5F is a view illustrating an application of the image filter 2 to a plurality of pixels of the picked-up image in accordance with the preferred embodiment of the present invention.

FIG. 5F shows the image filter 2 applied to the second line of the picture processed by the image filter 1. The filtering output of the image filter 2 is expressed by the following equation (5).

$$\text{Output } 2=o21+o22+o23+o24+ \text{---} +o2n-2+o2n-1+o2n-o2n+1-o2n+2-o2n+3-o2n+4 \text{---} -o22n-2-o22n-1-o22n \quad (5)$$

The equation (4) is entered into the equation (5).

Output 2=(−1)*(a10+a20+a

30)+(1)*(a12+a22+a

32)+(−1)*(a11+a21+a

31)+(1)*(a13+a23+a

33)+(−1)*(a12+a22+a

32)+(1)*(a14+a24+a

34)+(−1)*(a13+a23+a

33)+(1)*(a15+a25+a

35)+

(−1)*(a1n−3+a

2n−3+a3n−3)+(1)*(a

1n−1+a2n−1+a

3n−1)+(−1)*(a

1n−2+a2n−2+a3n−2)

+(1)*(a1n+a2n+a3n)+

(−1)*(a1n−1+a2n−1+a

3n−1)+(1)*(a1n+1+a

2n+1+a3n+1)

-

-

-

−((−1)*(a1n+a2n+a

3n)+(1)*(a1n+2+a

2n+2+a3n+2))−((−1)*(a

1n+1+a2n+1+a

3n+1)+(1)*(a1n+3+a

2n+3+a3n+3))

−((1)*(a1n+2+a

2n+2+a3n+2)+(1)*(a

1n+4+a2n+4+a

3n+4))−((1)*(a1n+3+a

2n+3+a3n+3)+(1)*(a

1n+5+a2n+5+a3n+5))

-

-

-

−((−1)*(a12n−3+a

22n−3+a32n−3)+(1)*(a

12n−1+a22n−1+a

32n−1))−((−1)*(a12n−2+a

22n−2+a32n−2)

+(1)*(a12n+a22n+a

32n))−((1)*(a12n−1+a

22n−1+a32n−1)+(1)*(a

12n+1+a22n+1+a

32n+1))=(−1)*(a10+a

20+a30)+(−1)*(a11+a

21+a31)+(2)*(a1n+a2n+a

3n)+(2)*(a1n+1+a

2n+1+a3n+1)−(1)*(a

12n+a22n+a32n)−(1)*(a

12n+1+a22n+1+a

32n+1)           (5')

Based on this result, the output of the image filter 2 (i.e., convolutional output of the image filter 1+the image filter 2) is expressed by the composite filter shown in FIG. 5A.

Next, the calculation of the filtering output of the image filter 3 is explained.

Figure 5G:
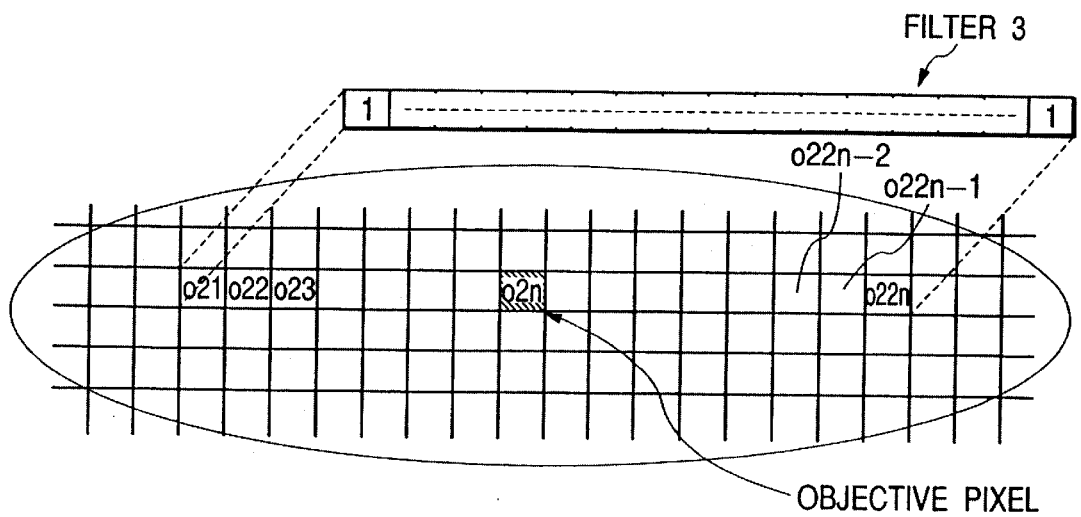
FIG. 5G is a view illustrating an application of the image filter 3 to a plurality of pixels of the picked-up image in accordance with the preferred embodiment of the present invention.

The image filter 3 is applied to the picture being filtered by the image filter 1. FIG. 5G shows the image filter 3 applied to the second line of the picture processed by the image filter 1. The filtering output of the image filter 3 is expressed by the following equation (6).

$$\text{Output } 3=o21+o22+o23+ \text{---} +o22n-2+o22n-1+o22n \quad (6)$$

The equation (4) is entered into the equation (6).

$$\text{Output } 3 = (-1)*(a10+a20+a30)+(1)*(a12+a22+a32)+(-1)*(a11+a21+a31)+(1)*(a13+a23+a33)+(-1)*(a12+a22+a32)+(1)*(a14+a24+a34)$$

-

-

-

$$+(-1)*(a12n{-}3+a22n{-}3+a32n{-}3)+(1)*(a12n{-}1+a22n{-}1+a32n{-}1)+(-1)*(a12n{-}2+a22n{-}2+a32n{-}2)+(1)*(a12n+a22n+a32n)+(-1)*(a12n{-}1+a22n{-}1+a32\mathit{1})$$

$$+(1)*(a12n{+}1+a22n{+}1+a32n{+}1)=(-1)*(a10+a20+a30)+(-1)*(a11+a21+a31)+(1)*(a12n+a22n+a32n)+(1)*(a12n{+}1+a22n{+}1+a32n{+}1) \tag{6'}$$

Based on this result, the output of the image filter 3 (i.e., convolutional output of the image filter 1+the image filter 3) is expressed by the composite filter shown in FIG. 5B.

As described above, the image filter 1 is not limited to the one shown in FIG. 4A.

For example, the image filter 1 of FIG. 4E may be used. In this case, it is preferable to use the image filter 2 shown in FIG. 4N whose filtering parameters are completely opposed to those of FIG. 4B. This combination will be explained later. The resultant composite filter of the image filter 1+image filter 2 is identical with that shown in FIG. 5A. The composite filter of the image filter 1+image filter 3 is shown in FIG. 5C, whose filtering parameters are completely opposed to those shown in FIG. 5B.

Alternatively, the image filter 1 of FIG. 4F may be used. In this case, the resultant composite filter of image filter 1+image filter 2 is shown in FIG. 5D. The composite filter of the image filter 1+image filter 3 is shown in FIG. 5E.

Returning to the flowchart of FIG. 3, the processing performed in the step S3 and the processing performed in the steps S4 and S5 are simultaneously executed, although actual data processing and computations will be interruptively performed in a computer (e.g, CPU) according to a main program.

Next, in a step S6, a difference C (=A−B') is obtained as a feature quantity representing the lane mark.

Then, in a step S7, the difference C representing the lane feature quantity is output to the video memory 23.

A practical processing of the above-described filtering operation of the present invention is performed in the following manner.

Figure 6A:
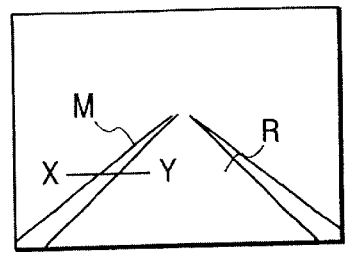
FIGS. 6A to 6F are an original picture and graphs illustrating a filtering procedure using the image filters 1 to 3 to detect a bright lane mark (true mark) in accordance with the preferred embodiment of the present invention.

FIG. 6A shows an original picked-up picture including a bright lane mark (M) drawn or printed on a dark road (R). It is now assumed that a scanning operation is performed on the pixels aligned along a horizontal line X-Y.

Figure 6B:
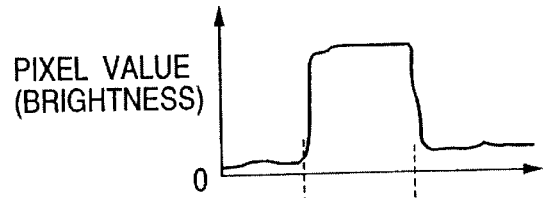

FIG. 6B shows a pixel value (i.e., brightness) distribution along the scanning line X-Y. As the lane mark M is brighter than the road R, a region corresponding to the bright lane mark M has a large signal intensity compared with the remaining region corresponding to the road R.

Figure 6C:
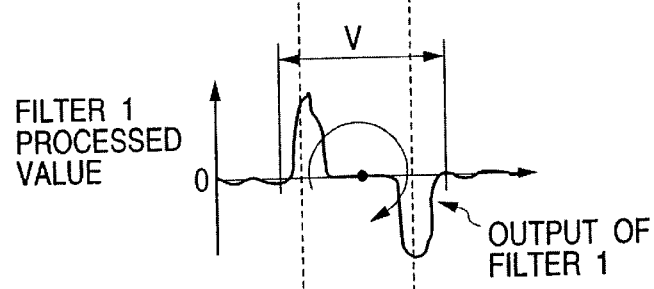

FIG. 6C shows a pixel value (i.e., brightness change) distribution along the scanning line X-Y obtained after the image filter 1 is applied to the original image of FIG. 6A.

In the scanning direction from left to right, the output signal of the image filter 1 starts increasing when the scanning point approaches the bright lane mark M, and has a large positive peak value at a portion corresponding to a left edge of the bright lane mark M. Then, the output signal of the image filter 1 stays at a low (0) level when the scanning point is entirely on the bright lane mark M. Then, the output signal of the image filter 1 starts decreasing when the scanning point approaches the road R, and has a large negative peak value at a portion corresponding to a right edge of the bright lane mark M. Then, the output signal of the image filter 1 stays at a low (0) level when the scanning point is entirely on the road R. In other words, the image filter 1 produces a pair of positive and negative peak values spaced from each other in a region "V" corresponding to the bright lane mark M.

As explained with reference to FIGS. 4A and 4D, the image filter 1 functions as a means for detecting a brightness change between neighboring pixels (i.e., a difference between two pixel values). When the image filter 1 is entirely positioned on a uniform brightness portion, its output is zero. When the image filter 1 is positioned on or near the boundary between the bright portion and the dark portion, the output becomes a significant value in response to the brightness change. Furthermore, a positive output signal of the image filter 1 indicates a transition from the dark portion to the bright portion. On the contrary, a negative output signal of the image filter 1 indicates a transition from the bright portion to the dark portion. In this respect, the image filter 1 can be referred as an outline or contour emphasizing filter capable of producing positive and negative peak values corresponding to the edges of the bright lane mark M.

Figure 6D:

FIG. 6D shows a pixel value (i.e., angular momentum) distribution along the scanning line X-Y obtained after the image filter 2 is applied to the picture of FIG. 6C. The image filter 2 consists of n positive filtering parameters (+1) and n negative filtering parameters (−1), i.e., "1, - - - , 1, −1, - - - −1" applicable to 1×2n pixels on the picked-up image, as explained with reference to FIG. 4B. It is now assumed that the image filter 2 is applied to the region entirely involving the bright lane mark M.

In this case, the left edge of the bright lane mark M is positioned left in the image filter 2 and the right edge of the bright lane mark M is positioned right in the image filter 2. Thus, based on the picture being processed by the image filter 1, the positive output value corresponding to the left edge of the bright lane mark M is multiplied with the positive filtering parameter (+1) of the image filter 2, producing a positive large value. The negative output value corresponding to the right edge of the bright lane mark M is multiplied with the negative filtering parameter (−1) of the image filter 2, producing a positive large value. As a result, the image filter 2 produces a sum of positive values representing the angular momentum (refer to FIG. 6C) caused in the clockwise direction about the center (i.e., objective pixel) of the image filter 2. This is why the output of the image filter 2 takes a positive peak value (i.e., maximum angular momentum) at the center of the bright lane mark M as shown in FIG. 6D.

Is short, the image filter 1 produces a filtered road picture including the emphasized outlines or contours of the bright lane mark M. The image filter 2 produces another filtered road picture including the angular momentum quantities about the center (i.e., objective pixel) of the image filter 2. In this case, the output of the image filter 1 (i.e., outline emphasizing value) is regarded as a vectorial quantity about the center (i.e., objective pixel) of the image filter 2. When the output of the image filter 2 is a positive large value, the likelihood or probability of the bright lane mark M is increased.

In another aspect, the image filter 2 can be regarded as a means for detecting a symmetrical disposition of positive and negative pixel values (i.e., outline emphasizing values of the image filter 1) with respect to the center (i.e., objective pixel) of the image filter 2.

Figure 6E:
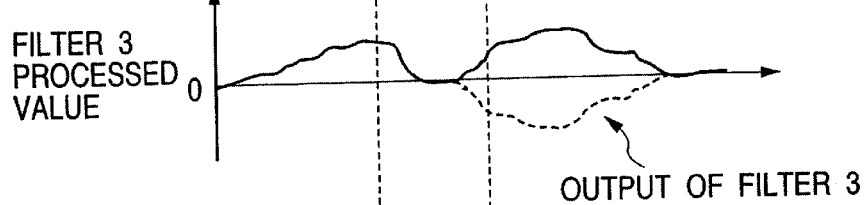

FIG. 6E shows a pixel value (absolute value) distribution along the scanning line X-Y obtained after the image filter 3 is applied to the picture of FIG. 6C.

The image filter 3 consists of 2n positive filtering parameters, i.e., "1, - - -, 1" applicable to 1×2n pixels on the picked-up image, as explained with reference to FIG. 4C. It is now assumed that the image filter 3 is applied to the region entirely involving the bright lane mark M.

In this case, the left edge of the bright lane mark M is positioned left in the image filter 3 and the right edge of the bright lane mark M is positioned right in the image filter 3. Thus, based on the picture being processed by the image filter 1, the output value of the image filter 1 is multiplied with +1 (i.e., the filtering parameter of the image filter 3). The image filter 1 produces a positive output in response to the left edge of the bright lane mark M and a negative output in response to the right edge of the bright lane mark M. These positive and negative outputs are canceled each other when summed up as an output of the image filter 3. This is why the output of the image filter 3 is 0 at the center of the bright lane mark M (refer to FIG. 6E).

The image filter 3 produces a positive output in the left region of the scanning line X-Y because the image filter 1 produces a positive peak value at left edge of the bright lane mark M. The image filter 3 produces a negative output in the right region of the scanning line X-Y because the image filter 1 produces a negative peak value at right edge of the bright lane mark M as shown by a dotted line in FIG. 6E.

The output of the image filter 3 is subsequently converted into an absolute value as indicated by a solid line in FIG. 6E.

Thus, the image filter 3 produces an accumulative absolute value of the pixel values of the picture being filtered by the image filter 1 (i.e., a sum of the absolute values of the outline emphasizing values). Accordingly, the output of the image filter 3 is responsive to the change of the output of the image filter 1, with a moderate change following the steep change of the output of the image filter 1 as shown by the dotted line in FIG. 6E.

Figure 6F:
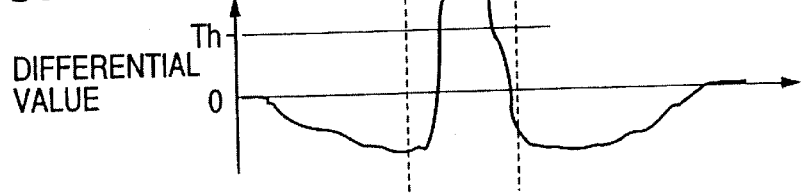

FIG. 6F shows a pixel value (differential value) distribution along the scanning line X-Y which is obtained by subtracting the output of the image filter 2 (i.e., angular momentum of the pixel values) by the absolute value of the output of the image filter 3 (i.e., accumulative absolute value of the pixel values).

As apparent from FIG. 6F, the resultant differential value produces a large positive value at the region corresponding to the bright lane mark M. In other words, this differential value is a good index representing the features of the bright lane mark M. In a practical data processing, the bright lane mark M can be surely detected by setting an appropriate positive threshold Th as shown in FIG. 6F.

Figure 7A:
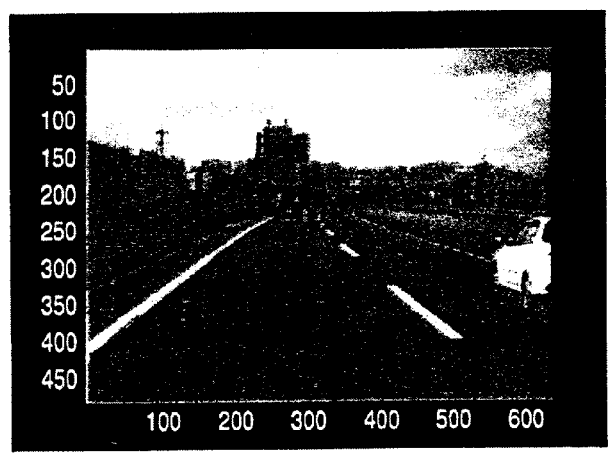
FIGS. 7A to 7C are views showing practical examples of the picked-up road picture and the output images processed by the image filters in accordance with the preferred embodiment of the present invention.
Figure 7B:
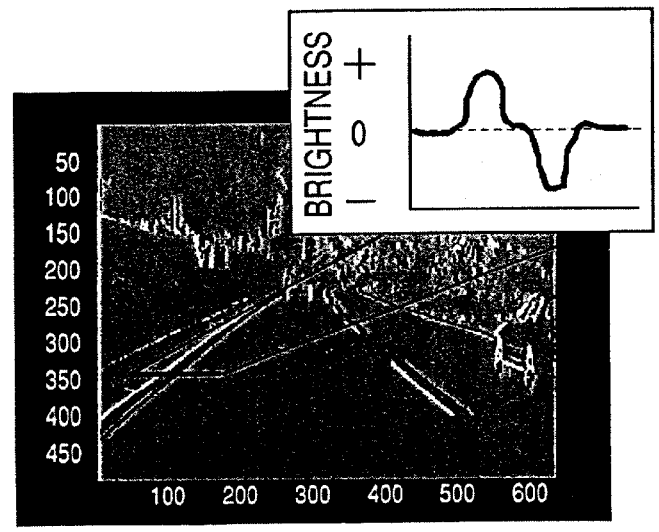
Figure 7C:
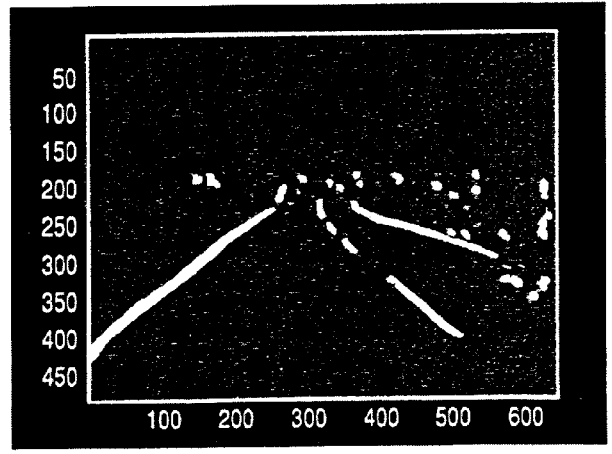

FIG. 7A shows an original road picture picked up by the CCD camera 10. FIG. 7B shows a road picture obtained after the image filter 1 is applied to the original image of FIG. 7A. As shown enlargedly, the outline or contour of the bright lane mark is emphasized and the brightness is opposed at the right and left edges of the bright lane mark. FIG. 7C shows a road picture obtained by subtracting the output of the image filter 2 (i.e., angular momentum of the pixel values) by the absolute value of the output of the image filter 3 (i.e., accumulative absolute value of the pixel values).

The picked-up image may contain a dark lane mark which is a false lane mark in this case. The present invention can surely discriminate the dark lane mark from the bright lane mark.

Figure 8A:
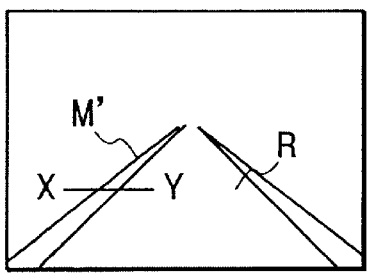
FIGS. 8A to 8F are an original picture and graphs illustrating the filtering procedure applied to a dark lane mark (false mark) in accordance with the preferred embodiment of the present invention.

FIG. 8A shows another original picked-up picture including a dark lane mark (M') drawn or printed on a dark road (R). It is now assumed that a scanning operation is performed on the pixels aligned along a horizontal line X-Y.

Figure 8B:
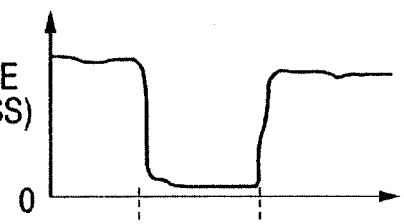

FIG. 8B shows a pixel value (i.e., brightness) distribution along the scanning line X-Y. As the lane mark M' is darker than the road R, a region corresponding to the dark lane mark M' has a smaller signal intensity compared with the remaining region corresponding to the road R.

Figure 8C:
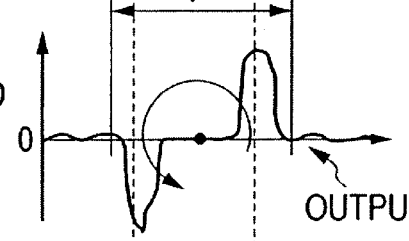

FIG. 8C shows a pixel value (i.e., brightness change) distribution along the scanning line X-Y obtained after the image filter 1 is applied to the original image of FIG. 8A.

In the scanning direction from left to right, the output signal of the image filter 1 starts decreasing when the scanning point approaches the dark lane mark M', and has a large negative peak value at a portion corresponding to the left edge of the dark lane mark M'. Then, the output signal of the image filter 1 stays at a low (0) level when the scanning point is entirely on the dark lane mark M'. Then, the output signal of the image filter 1 starts increasing when the scanning point approaches the road R, and has a large positive value at a portion corresponding to the right edge of the dark lane mark M'. Then, the output signal of the image filter 1 stays at a low (0) level when the scanning point is entirely on the road R. In other words, the image filter 1 produces a pair of negative and positive peak values spaced from each other in the region "V" corresponding to the dark lane mark M'.

As explained above, the image filter 1 functions as a means for detecting a brightness change between neighboring pixels (i.e., a difference between two pixel values). When the image filter 1 is entirely positioned on a uniform brightness portion, its output is zero. When the image filter 1 is positioned on or near the boundary between the bright portion and the dark portion, the output becomes a significant value in response to the brightness change. Furthermore, a positive output signal of the image filter 1 indicates a transition from the dark portion to the bright portion. On the contrary, a negative output signal of the image filter 1 indicates a transition from the bright portion to the dark portion.

Figure 8D:
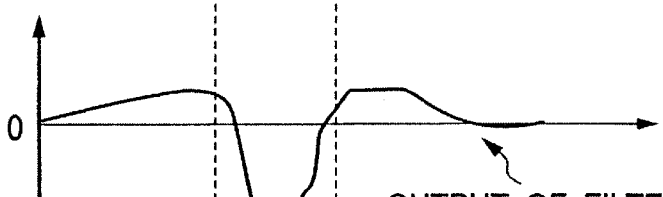

FIG. 8D shows a pixel value (i.e., angular momentum) distribution along the scanning line X-Y obtained after the image filter 2 is applied to the picture of FIG. 8C. The image filter 2 consists of n positive filtering parameters (+1) and n negative filtering parameters (−1), i.e., "1, - - -, 1, −1, - - - −1" applicable to 1×2n pixels on the picked-up image, as explained above. It is now assumed that the image filter 2 is applied to the region entirely involving the dark lane mark M'.

The left edge of the dark lane mark M' is positioned left in the image filter 2 and the right edge of the dark lane mark M' is positioned right in the image filter 2. Thus, based on the picture being processed by the image filter 1, the negative output value corresponding to the left edge of the dark lane mark M' is multiplied with the positive filtering parameter (+1) of the image filter 2, producing a negative large value. The positive output value corresponding to the right edge of the dark lane mark M' is multiplied with the negative filtering parameter (−1) of the image filter 2, producing a negative large value. As a result, the image filter 2 produces a sum of negative values representing the angular momentum (refer to FIG. 8C) caused in the counterclockwise direction about the center (i.e., objective pixel) of the image filter 2. This is why the output of the image filter 2 takes a negative peak value (i.e., minimum angular momentum) at the center of the dark lane mark M' as shown in FIG. 5D. In this embodiment, a positive sign is assigned to the clockwise angular momentum and a negative sign is assigned to the counterclockwise angular momentum.

The image filter 1 thus produces a filtered road picture including the emphasized outlines or contours of the dark lane mark M' (refer to FIG. 8C), although the pixel values are opposite to those shown in FIG. 6C. The image filter 2 produces the filtered road picture including the angular momentum quantities about the center (i.e., objective pixel) of the image filter 2.

Figure 8E:
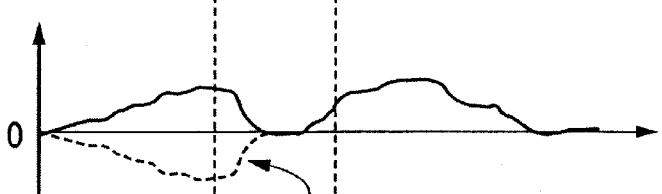

FIG. 8E shows a pixel value (absolute value) distribution along the scanning line X-Y obtained after the image filter 3 is applied to the picture of FIG. 8C.

The image filter 3 consists of 2n positive filtering parameters, i.e., "1, - - - ,1" applicable to 1×2n pixels on the picked-up image, as explained above. It is now assumed that the image filter 3 is applied to the region entirely involving the dark lane mark M'.

The left edge of the dark lane mark M' is positioned left in the image filter 3 and the right edge of the dark lane mark M' is positioned right in the image filter 3. Thus, based on the picture being processed by the image filter 1, the output value of the image filter 1 is multiplied with +1 (i.e., the filtering parameter of the image filter 3). The image filter 1 produces a negative output in response to the left edge of the dark lane mark M' and a positive output in response to the right edge of the dark lane mark M'. These negative and positive outputs are canceled each other when summed up as an output of the image filter 3. This is why the output of the image filter 3 is 0 at the center of the lane mark M' (refer to FIG. 8E).

The image filter 3 produces a negative output in the left region of the scanning line X-Y because the image filter 1 produces a negative peak value at left edge of the dark lane mark M'. The image filter 3 produces a positive output in the right region of the scanning line X-Y because the image filter 1 produces a positive peak value at right edge of the dark lane mark M' as shown by a dotted line in FIG. 8E.

The output of the image filter 3 is subsequently converted into an absolute value as indicated by a solid line in FIG. 8E.

Thus, the image filter 3 produces an accumulative absolute value of the pixel values of the picture being filtered by the image filter 1 (i.e., a sum of the absolute values of the outline emphasizing values). The output of the image filter 3 is responsive to the change of the output of the image filter 1, with a moderate change following the steep change of the output of the image filter 1 as shown by the dotted line in FIG. 8E.

Figure 8F:
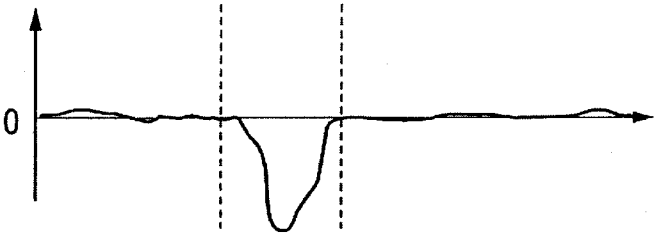

FIG. 8F shows a pixel value (differential value) distribution along the scanning line X-Y which is obtained by subtracting the output of the image filter 2 (i.e., angular momentum of the pixel values) by the absolute value of the output of the image filter 3 (i.e., accumulative absolute value of the pixel values).

As apparent from FIG. 8F, the resultant differential value produces a large negative value at the region corresponding to the dark lane mark M', which is completely opposed to the large positive value of the bright lane mark M (i.e., true lane mark). Accordingly, the positive threshold Th (refer to FIG. 6F) does not detect the dark lane mark M' (i.e., false lane mark). In other words, the dark lane mark M' can be neglected. In this manner, the dark lane mark M' is surely discriminable from the bright lane mark M based on the resultant differential value.

The picked-up image may contain noise images other than the lane mark. The present invention can surely discriminate such noise images from the true lane mark (i.e., bright lane mark in this embodiment).

Figure 9A:
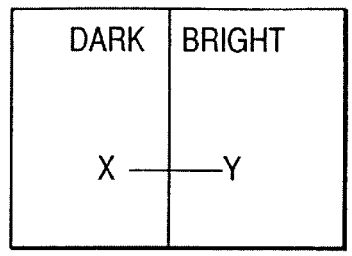
FIGS. 9A to 9F are an original picture and graphs illustrating the filtering procedure applied to a dark/bright image (false image) in accordance with the preferred embodiment of the present invention.

FIG. 9A shows an original picked-up picture including a dark region and a bright region (other than the bright lane mark M). It is now assumed that a scanning operation is performed on the pixels aligned along a horizontal line X-Y crossing the boundary between the dark portion and the bright portion.

Figure 9B:
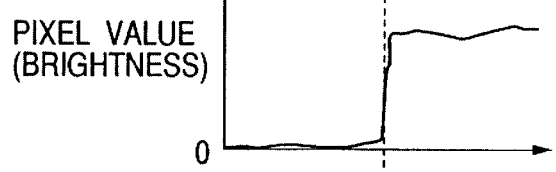

FIG. 9B shows a pixel value (i.e., brightness) distribution along the scanning line X-Y. The dark region has a smaller signal intensity compared with the bright region.

Figure 9C:
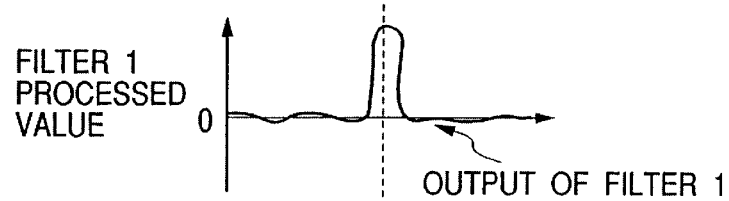

FIG. 9C shows a pixel value (i.e., brightness change) distribution along the scanning line X-Y obtained after the image filter 1 is applied to the original image of FIG. 9A.

In the scanning direction from left to right, the output signal of the image filter 1 has a large positive peak value at a portion corresponding to the boundary between the dark portion and the bright portion. The output signal of the image filter 1 stays at a low (0) level in the remaining region. In other words, the image filter 1 produces a single positive peak value at the boundary between the dark portion and the bright portion.

As explained above, the image filter 1 functions as a means for detecting a brightness change between neighboring pixels (i.e., a difference between two pixel values). The image filter 1 produces a positive output signal in a transitional region from the dark portion to the bright portion.

Figure 9D:
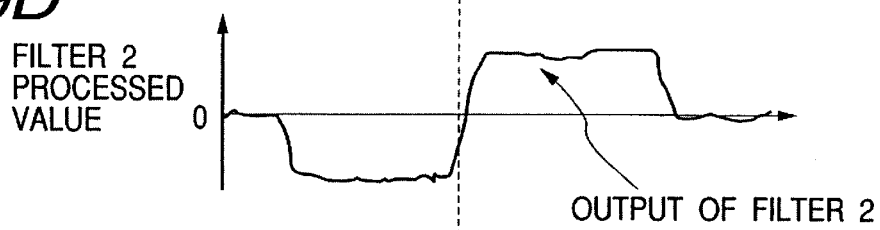

FIG. 9D shows a pixel value (i.e., angular momentum) distribution along the scanning line X-Y obtained after the image filter 2 is applied to the picture of FIG. 9C. The image filter 2 consists of n positive filtering parameters (+1) and n negative filtering parameters (−1), i.e., "1, - - - , 1, −1, - - - −1" applicable to 1×2n pixels on the picked-up image, as explained above.

The boundary between the dark region and the bright region is positioned right in the image filter 2 when the image filter 2 is located at the left side of the scanning line X-Y. The positive peak value is thus multiplied with the negative filtering parameter (−1) of the image filter 2, producing a negative large value. On the other hand, the boundary between the dark region and the bright region is positioned left in the image filter 2 when the image filter 2 is located at the right side of the scanning line X-Y. The positive peak value is thus multiplied with the positive filtering parameter (+1) of the image filter 2, producing a positive large value, as shown in FIG. 9D.

Figure 9E:
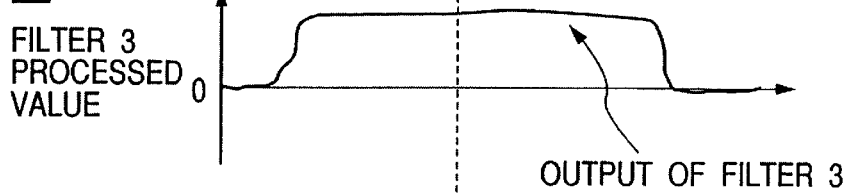

FIG. 9E shows a pixel value (absolute value) distribution along the scanning line X-Y obtained after the image filter 3 is applied to the picture of FIG. 9C.

The image filter 3 consists of 2n positive filtering parameters, i.e., "1, - - - , 1" applicable to 1×2n pixels on the picked-up image, as explained above.

The positive peak value is thus multiplied with the positive filtering parameter (+1) of the image filter 3 in the entire region of the scanning line X-Y.

The output of the image filter 3 is subsequently converted into an absolute value as indicated by a solid line in FIG. 9E, although the output of the image filter 3 is positive in this case.

Figure 9F:
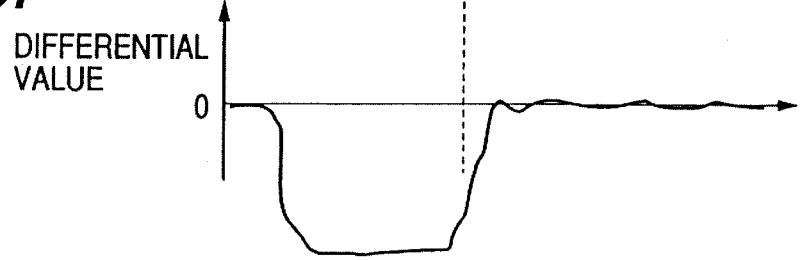

FIG. 9F shows a pixel value (differential value) distribution along the scanning line X-Y which is obtained by subtracting the output of the image filter 2 by the absolute value of the output of the image filter 3.

As apparent from FIG. 9F, the resultant differential value produces a large negative value at the left region of the scanning line X-Y. Accordingly, the transition from the dark region to the bright region is not detected by the positive threshold Th (refer to FIG. 6F). In this manner, the positive threshold Th does not detect the noise image of the dark and bright regions. In other words, the noise image of the dark and bright regions is surely discriminable from the true (i.e., bright) lane mark based on the resultant differential value.

Figure 10A:
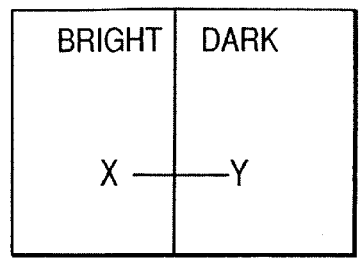
FIGS. 10A to 10F are an original picture and graphs illustrating the filtering procedure applied to a bright/dark image (false image) in accordance with the preferred embodiment of the present invention.

FIG. 10A shows another original picked-up picture including oppositely arranged bright and dark regions. It is now assumed that a scanning operation is performed on the pixels aligned along a horizontal line X-Y crossing the boundary between the dark portion and the bright portion.

Figure 10B:
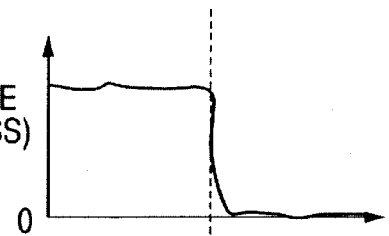

FIG. 10B shows a pixel value (i.e., brightness) distribution along the scanning line X-Y. The bright region has a larger signal intensity compared with the dark region.

Figure 10C:
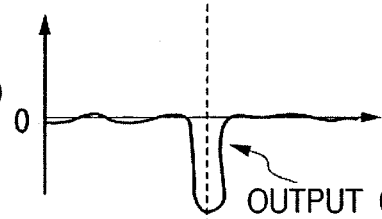

FIG. 10C shows a pixel value (i.e., brightness change) distribution along the scanning line X-Y obtained after the image filter 1 is applied to the original image of FIG. 10A.

In the scanning direction from left to right, the output signal of the image filter 1 has a large negative peak value at a portion corresponding to the boundary between the bright portion and the dark portion. The output signal of the image filter 1 stays at a low (0) level in the remaining region. In other words, the image filter 1 produces a single negative peak value at the boundary between the bright portion and the dark portion.

As explained above, the image filter 1 functions as a means for detecting a brightness change between neighboring pixels (i.e., a difference between two pixel values). The image filter 1 produces a negative output signal in a transitional region from the bright portion to the dark portion.

Figure 10D:
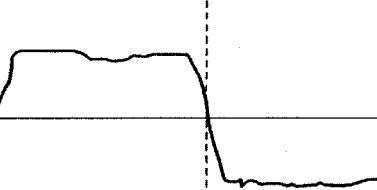

FIG. 10D shows a pixel value (i.e., angular momentum) distribution along the scanning line X-Y obtained after the image filter 2 is applied to the picture of FIG. 10C. The image filter 2 consists of n positive filtering parameters (+1) and n negative filtering parameters (−1), i.e., "1, - - - , 1, −1, - - - −1" applicable to 1×2n pixels on the picked-up image, as explained above.

The boundary between the bright region and the dark region is positioned right in the image filter 2 when the image filter 2 is located at the left side of the scanning line X-Y. The negative peak value is thus multiplied with the negative filtering parameter (−1) of the image filter 2, producing a positive large value. On the other hand, the boundary between the bright region and the dark region is positioned left in the image filter 2 when the image filter 2 is located at the right side of the scanning line X-Y. The negative peak value is thus multiplied with the positive filtering parameter (+1) of the image filter 2, producing a negative large value, as shown in FIG. 10D.

Figure 10E:
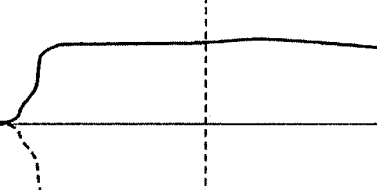

FIG. 10E shows a pixel value (absolute value) distribution along the scanning line X-Y obtained after the image filter 3 is applied to the picture of FIG. 10C.

The image filter 3 consists of 2n positive filtering parameters, i.e., "1, - - - , 1" applicable to 1×2n pixels on the picked-up image, as explained above.

The negative peak value is thus multiplied with the positive filtering parameter (+1) of the image filter 3 in the entire region of the scanning line X-Y.

The output of the image filter 3 (a negative value in this case) is subsequently converted into an absolute value as indicated by a solid line in FIG. 10E.

Figure 10F:
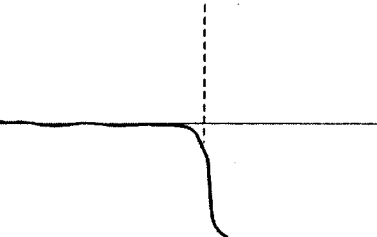

FIG. 10F shows a pixel value (differential value) distribution along the scanning line X-Y which is obtained by subtracting the output of the image filter 2 by the absolute value of the output of the image filter 3.

As apparent from FIG. 10F, the resultant differential value produces a large negative value at the right region of the scanning line X-Y. Accordingly, the transition from the bright region to the dark region is not detected by the positive threshold Th (refer to FIG. 6F). In this manner, the positive threshold Th does not detect the noise image of the bright and dark regions. In other words, the noise image of the bright and dark regions is surely discriminable from the true (i.e., bright) lane mark based on the resultant differential value.

The ASIC 22 thus removes unnecessary or noise images from the picked-up road picture by performing the above-described preprocessing, and produces an improved picture containing the true lane mark only.

The CPU 24 performs a predetermined lane mark recognition based on the preprocessed road image produced from the ASIC 22. Furthermore, the CPU 24 performs a predetermined vehicle traveling control based on the result of the lane mark recognition.

Figure 11:
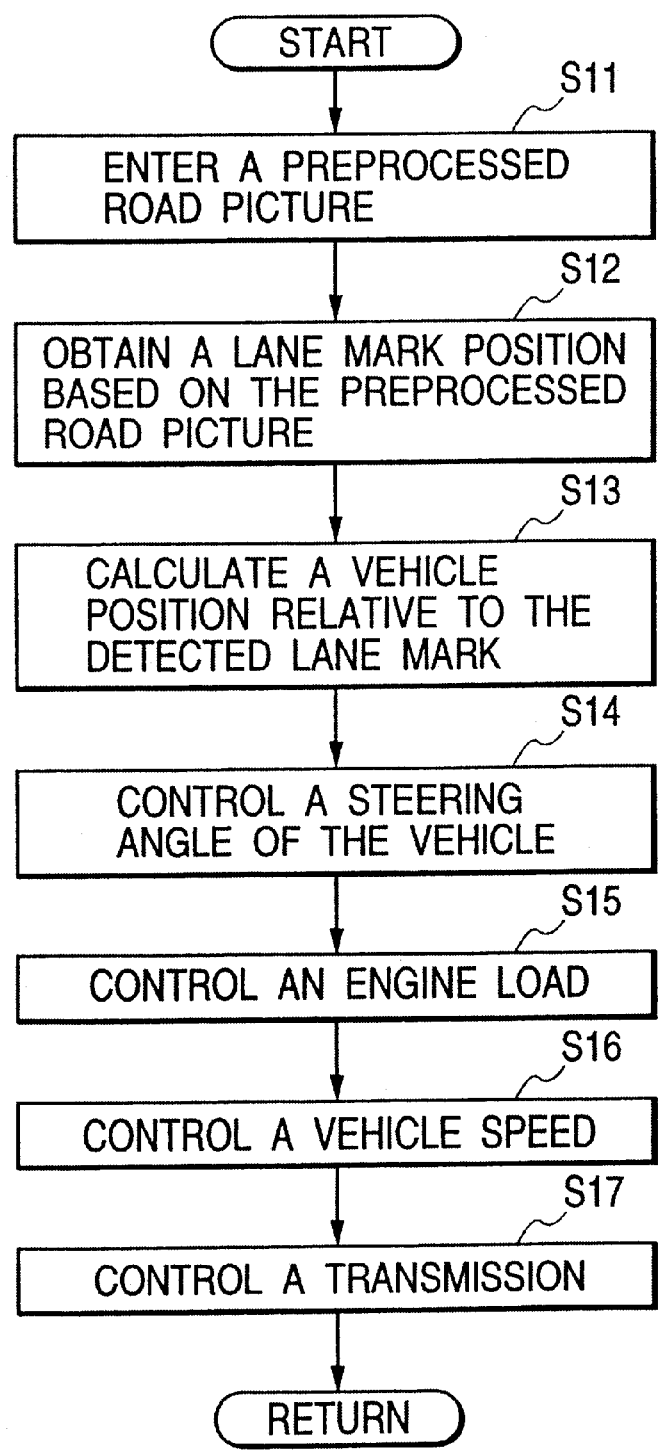
FIG. 11 is a flowchart showing a practical example of the lane mark recognition and vehicle control processing performed in accordance with the preferred embodiment of the present invention.

FIG. 11 shows a practical example of the lane mark recognition and vehicle control processing which is interruptively performed at predetermined intervals in the CPU 24 or a separate comparable computer.

First, in a step S11, a preprocessed road picture is input to the CPU 24 from the video memory 23 which temporarily stores the video data produced from the ASIC 22. In a step S12, the CPU obtains a lane mark position based on the preprocessed road picture. In a step S13, the CPU 24 calculates a vehicle position relative to the detected lane mark. Then, in the succeeding steps S14 to S17, the CPU 24 controls a steering angle, an engine load, a vehicle speed, and a transmission of the vehicle based on a detected relationship between the vehicle and the lane mark.

The width of the lane mark is not always constant. A picked-up image may contain a plurality of lane marks different in width. A specific lane mark, for example drawn at a branch or merging portion, may be thicker than an ordinary lane mark. The width of the lane mark may be intentionally differentiated to discriminate one from another, for example, when a plurality of paths are prepared on the floor of the factory using the automatic guided vehicle. In such a case, it is preferable to eliminate all of unnecessary lane marks.

To this end, the present invention makes it possible to change the size of the image filters 2 and 3.

FIG. 12A shows an example of the image filter 2 which includes a central dead zone with a predetermined width so that no pixel values (i.e., the angular momentum and the absolute value) are obtained from this dead zone.

When the image filter 2 having a dead zone is applied to the narrower lane mark, the brightness changes occurring at both ends of the lane mark cannot be sensed simultaneously. The lane mark feature quantity is not detected. Thus, providing the dead zone makes it possible to completely remove any lane mark narrower than the dead zone. In other words, the detectable lane marks can be substantially limited to the lane marks wider than the dead zone and narrower than the filter width.

First, the calculation of the filtering output of the FIG. 12A image filter 2 is explained.

Figure 5H:
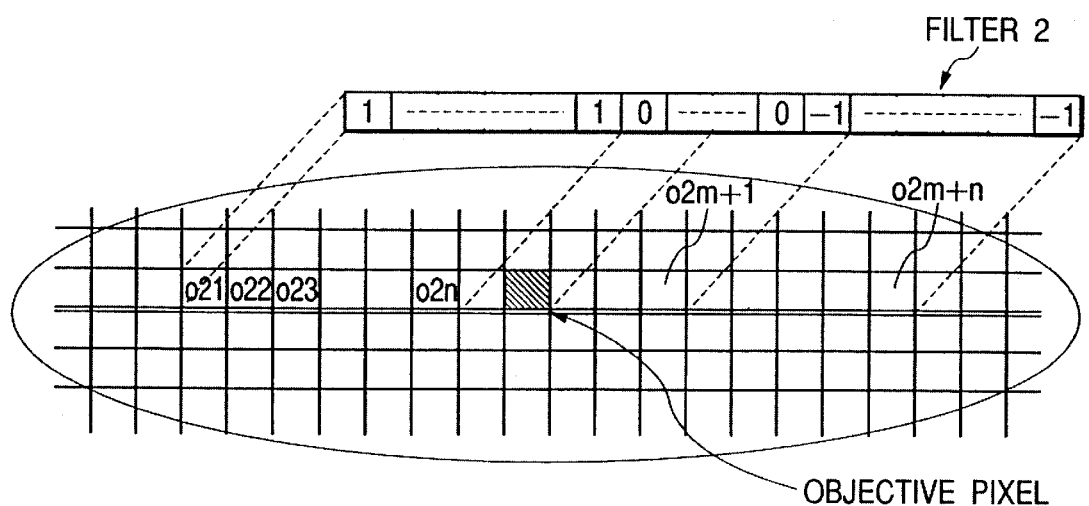
FIG. 5H is a view illustrating an application of the image filter 2 with a dead zone to a plurality of pixels of the picked-up image in accordance with the preferred embodiment of the present invention.

FIG. 5H shows the image filter 2 (FIG. 12A) applied to the second line of the picture processed by the image filter 1. The filtering output of the image filter 2 is expressed by the following equation (7).

$$\text{Output } 2 = o21 + o22 + o23 + o24 + \cdots + o2n-2 + o2n-1 + o2n - o2m+1 - o2m+2 - o2m+3 - o2m+4 \cdots - o2m+n-2 - o2m+n-1 - o2m+n \quad (7)$$

The equation (4) is entered into the equation (7).

Output 2=(−1)*(a10+a20+a30)+(1)*(a12+a22+a32)+(−1)*(a11+a21+a31)+(1)*(a13+a23+a33)+(−1)*(a12+a22+a32)+(1)*(a14+a24+a34)+(−1)*(a13+a23+a33)+(1)*(a15+a25+a35)

−

−

+(−1)*(a1n−3+a2n−3+a3n−3)

+(1)*(a1n1+a2n−1+a3n−1)+

(−1)*(a1n−2+a2n−2+a3n−2)+(1)*(a1n+a2n+a3n)

+(−1)*(a1n−1+a2n−1+a3n−1)+(1)*(a1n+1+a2n+1+a3n+1)

−

−

−((−1)*(a1m+a2m+a3m)+(1)*(a1m+2+a2m+2+a3m+2))−((−1)*(a1m+1+a2m+1+a3m+1)

+(1)*(a1m+3+a2m+3+a3m+3))−

((−1)*(a1m+2+a2m+2+a3m+2)+(1)*(a1m+4+a2m+4+a3m+4))−

((−1)*(a1m+3+a2m+3+a3m+3)

+(1)*(a1m+5+a2m+5+a3m+5))

−

−

((−1)*(a1m+n−3+a2m+n−3+a3m+n−3)

+(1)*(a1m+n−1+a2m+n−1+a3m+n−1))−

((−1)*(a1m+n−2+a2m+n−2+a3m+n−2)

+(1)*(a1m+n+a2m+n+a3m+n))−

((−1)*(a1m+n−1+a2m+n−1+a3m+n−1)

+(1)*(a1m+n+1+a2m+n+1+a3m+n+1))

=(−1)*(a10+a20+a30)

+(−1)*(a11+a21+a31)

+(1)*(a1n+a2n+a3n)

+(1)*(a1n+1+a2n+1+a3n+1)−

(−1)*(a1m+a2m+a3m)−

(−1)*(a1m+1+a2m+1+a3m+1)−

(1)*(a1m+n+a2m+n+a3m+n))−

(1)*(a1m+n+1+a2m+n+1+a3m+n+1)   (7')

Based on this result, the output of the image filter 2 (i.e., convolutional output of the image filter 1+the image filter 2) is expressed by the composite filter shown in FIG. 13A.

FIG. 12B shows an example of the image filter 3 which includes the same cental dead zone as that of the FIG. 12A so that no pixel values (i.e., the angular momentum and the absolute value) are obtained from this dead zone.

Next, the calculation of the filtering output of the image filter 3 is explained.

Figure 5I:
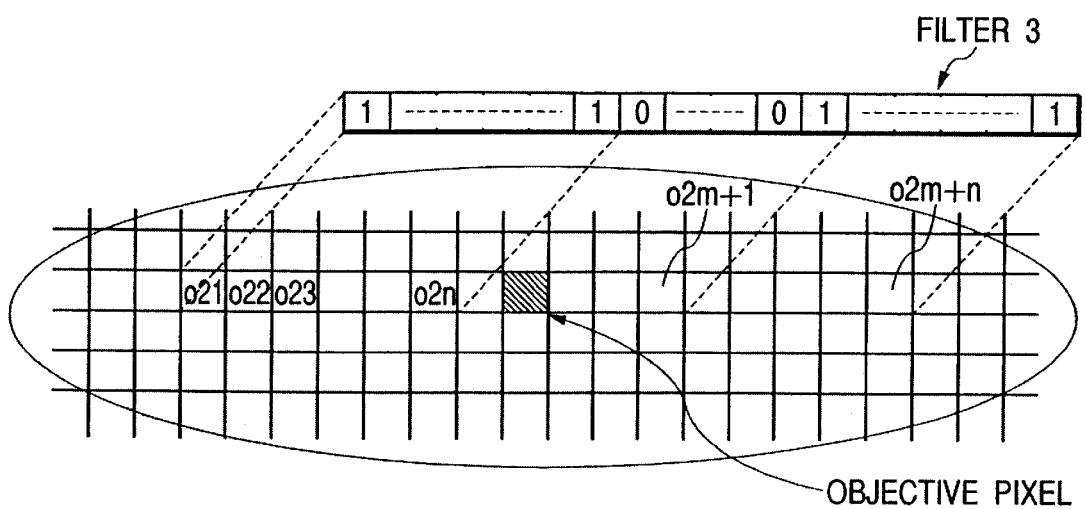
FIG. 5I is a view illustrating an application of the image filter 3 with a dead zone to a plurality of pixels of the picked-up image in accordance with the preferred embodiment of the present invention.

FIG. 5I shows the image filter 3 (FIG. 12B) applied to the second line of the picture processed by the image filter 1. The filtering output of the image filter 3 is expressed by the following equation (8).

Output 3=$o21+o22+o23+o24$ - - - $+o2n-2+o2n-1+o2n+o2m+1+o2m+2+o2m+3+o2m+4$- - - $+o2m+n-2+o2m+n-1+o2m+n$ (8)

The equation (4) is entered into the equation (8).

Output 3=$(-1)*(a10+a20+a30)+(1)*(a12+a22+a32)+$ $(-1)*(a11+a21+a31)+(1)*(a13+a23+a33)+$ $(1)*(a12+a22+a32)+(1)*(a14+a24+a34)+$ $(1)*(a13+a23+a33)+(1)*(a15+a25+a35)$

−

−

$+(-1)*(a1n-3+a2n-3+a3n-3)+(1)*(a1n-1+a2n-1+a3n-1)$ $+(-1)*(a1n-2+a2n-2+a3n-2)+(1)*(a1n+a2n+a3n)+(-1)*(a1n-1+a2n-1+a3n-1)$ $+(1)*(a1n+1+a2n+1)$

−

−

$+(-1)*(a1m+a2m+a3m)$ $+(1)*(a1m+2+a2m+2+a3m+2)+(-1)*(a1m+1+a2m+1+a3m+1)+(1)*(a1m+3+a2m+3+a3m+3)$ $+(-1)*(a1m+2+a2m+2+a3m+2)+(1)*(a1m+4+a2m+4+a3m+4)$ $(-1)*(a1m+3+a2m+3+a3m+3)+(1)*(a1m+5+a2m+5+a3m+5)$

−

−

$+(-1)*(a1m+n-3+a2m+n-3+a3m+n-3)$ $+(1)*(a1m+n-1+a2m+n-1+a3m+n-1)$ $+(-1)*(a1m+n-2+a2m+n-2+a3m+n-2)$ $+(1)*(a1m+n+a2m+n+a3m+n))+(-1)*(a1m+n-1+a2m+n-1+a3m+n-1)+(1)*(a1m+n-1+a2m+n-1+a3m+n-1)$ $+(1)*(a1m+n+1+a2m+n+1+a3m+n+1)$

=$(-1)*(a10+a20+a30)+(-1)*(a11+a21+a31)$ $+(1)*(a1n+a2n+a3n))$ $+(1)*(a1n+1+a2n+1+a3n+1))$ $+(-1)*(a1m+a2m+a3m))+(-1)*(a1m+1+a2m+1+a3m+1))$ $+(1)*(a1m+n+a2m+n+a3m+n))+(1)*(a1m+n+1+a2m+n+1+a3m+n+1))$ (8′)

Based on this result, the output of the image filter 3 (i.e., convolutional output of the image filter 1+the image filter 3) is expressed by the composite filter shown in FIG. 13B.

The dead zone length is equal to (m−n) pixels, and the filter length is equal to (m+n) pixels. The size of the dead zone and the image filters 2 and 3 can be thus arbitrarily modified by changing the values of "m" and "n".

FIGS. 14A to 14D show an original road picture and some examples of the road pictures actually obtained by using the image filter of the present invention.

Figure 14A:
FIGS. 14A to 14D are views showing an original road picture and some examples of the road pictures actually obtained by using the image filters of the preferred embodiment of the present invention.

FIG. 14A shows an original road picture including a first lane mark M1 having an ordinary width and a second lane mark M2 having a wider width (approximately two times the ordinary width).

Figure 14B:
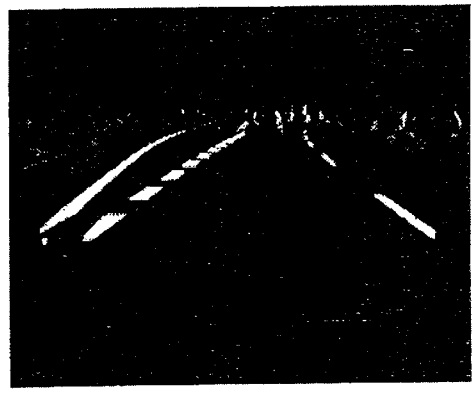

FIG. 14B shows a road picture obtained by using the image filters 2 and 3 having no dead zone. Both of the lane marks M1 and M2 are clearly detected.

Figure 14C:

FIG. 14C shows a road picture obtained by using the image filters 2 and 3 wider than the first lane mark M1 and narrower than the second lane mark M2. Only the first lane mark M1 is clearly detected.

Figure 14D:
Figure 15:
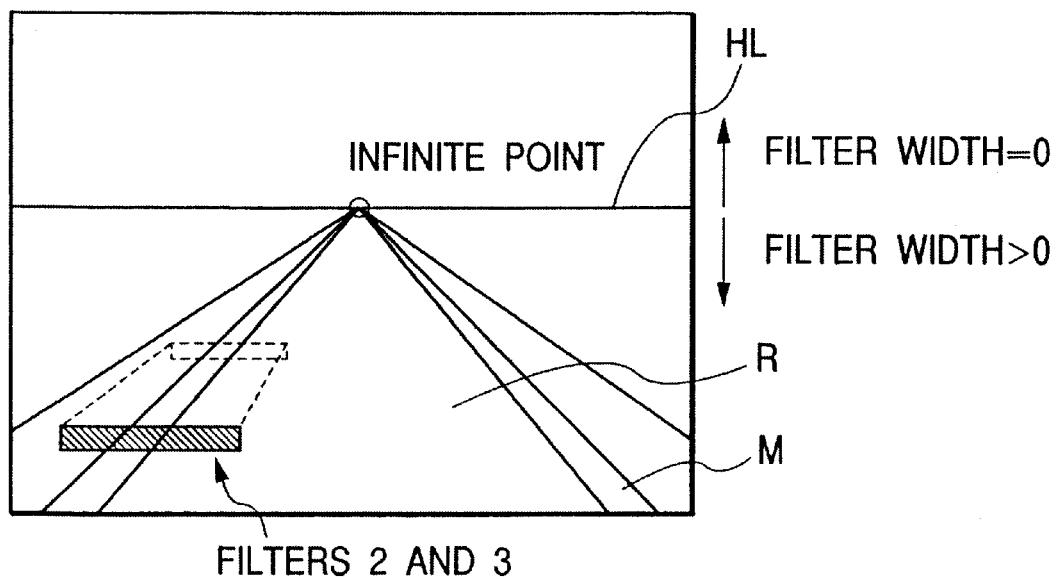
FIG. 15 is a view illustrating a modification of the filter size in relationship with an infinite point in accordance with the preferred embodiment of the present invention.
Figure 16:
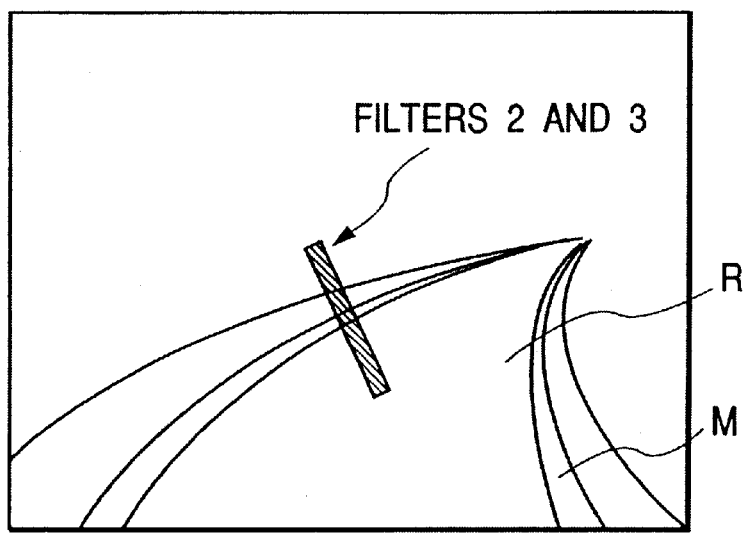
FIG. 16 is a view illustrating an optical setting of the image filters 2 and 3 in accordance with the preferred embodiment of the present invention.

FIG. 14D shows a road picture obtained by using the image filters 2 and 3 wider than the second lane mark M2 and having a central dead zone wider than the first lane mark M1. Only the second lane mark M2 is clearly detected.

In this manner, adjusting the filter width and the dead zone width makes it possible to obtain an intended lane mark only by removing other lane marks.

The CCD camera 10 is usually located at the ceiling above the driver's seat in the passenger compartment of the vehicle, as shown in FIG. 2. The road picture ahead of the vehicle is thus image-picked up by the CCD camera 10 according to the perspective representation. Even when the road has a constant width, the road width on the picked-up picture is wider in the lower region (i.e., at the near side) and narrower in the upper region (i.e., at the far side) due to the perspective representation.

Accordingly, the present invention adjusts the filter width and the dead zone width so as to have a width widened at the lower side (i.e., near side) of the picked-up image and narrowed at the upper side (i.e., far side) of the picked-up image.

In this case, it is preferable to perform the adjustment of the filter width and the dead zone width based on a perspective transformation applied to the picked-up image.

In actual setting of the camera angle of the CCD camera 10, the horizon HL is positioned at an altitudinal height spaced from the top by a predetermined vertical distance equivalent to ⅓ of the overall vertical length of the picked-up picture. In this case, none of the road R and the lane mark M exists in the upper one-third region of the picked-up picture. Therefore, it is preferable to set the filter width to zero at a predetermined upper region of the picked-up image where no lane mark M is present. With this setting, it becomes possible to eliminate unnecessary image processing.

The predetermined upper region including no lane mark M is regarded as a region higher than an infinite position of the lane mark M on the picked-up picture.

Furthermore, to realize a simplified picked-up image processing, it is preferable that the image filters 2 and 3 extend in a horizontal direction of the picked-up image since the image processing is generally performed with reference to the horizontal direction and the vertical direction of the picked-up image.

Especially, the lane mark M on the picked-up image extends in the up-and-down direction although shown by the perspective representation. Thus, the horizontal processing zone crosses perpendicularly to the lane mark M. This is preferable for effectively and accurately performing the picked-up image preprocessing to detect the lane mark M.

However, the road R does not always extend straight forward and flexibly changes its curvature according to the environmental conditions. If the vehicle is traveling on a curved road, the lane mark M may extend in the horizontal direction rather than in the vertical direction on the picked-up image. In this case, it is preferable that the image filters 2 and 3 is extendable in the vertical direction as well as in the horizontal direction of the picked-up image.

In short, it is preferable that the image filters 2 and 3 is set along a direction normal to the lane mark M on the picked-up image.

The picked-up image of the road R and the lane mark M does not cause a sudden and steep change. The present position of the lane mark M is almost identical with or very close to the previously detected position of the lane mark M. Accordingly, to simplify the picked-up image preprocessing and reduce the substantial time and cost in this preprocessing, the present invention optimizes the inclination angle of the image filters 2 and 3 based on a previously detected position of the lane mark M in the lane mark recognizing apparatus with which the picked-up image preprocessing apparatus is incorporated.

Although the above-described preprocessing of the picked-up image is performed in the ASIC 22, it is needless to say that the above-described preprocessing of the picked-up image can be performed in the CPU 24.

The lane mark is not limited to a bright lane mark. For example, dark guide lines may be printed on a relatively bright floor in a factory using an automatic guided vehicle.

In this case, a dark lane mark is a true lane mark to be detected. According to the present invention, there are two methods for detecting the dark lane mark.

The first method is explained.

FIG. 17A shows an original picked-up picture including a dark lane mark M' drawn or printed on a bright road R. It is now assumed that a scanning operation is performed on the pixels aligned along a horizontal line X-Y.

FIG. 17B shows a pixel value (i.e., brightness) distribution along the scanning line X-Y. As the lane mark M' is darker than the road R, a region corresponding to the dark lane mark M' has a small signal intensity compared with the remaining region corresponding to the road R.

FIG. 17C shows a pixel value (i.e., brightness change) distribution along the scanning line X-Y obtained after the image filter 1 is applied to the original image of FIG. 17A.

According to the first method, the image filter 1 of FIG. 4A is replaced by the image filter 1 shown in FIG. 4E.

In the scanning direction from left to right, the output signal of the image filter 1 starts increasing when the scanning point approaches the dark lane mark M', and has a large positive peak value at a portion corresponding to a left edge of the dark lane mark M'. Then, the output signal of the image filter 1 stays at a low (0) level when the scanning point is entirely on the dark lane mark M'. Then, the output signal of the image filter 1 starts decreasing when the scanning point approaches the road R, and has a large negative peak value at a portion corresponding to a right edge of the dark lane mark M'. Then, the output signal of the image filter 1 stays at a low (0) level when the scanning point is entirely on the road R. Thus, the image filter 1 produces a pair of positive and negative peak values spaced from each other in a region "V" corresponding to the dark lane mark M'.

FIG. 17D shows a pixel value (i.e., angular momentum) distribution along the scanning line X-Y obtained after the image filter 2 is applied to the picture of FIG. 17C. The image filter 2 consists of n positive filtering parameters (+1) and n negative filtering parameters (−1), i.e., "1, - - - , 1, −1, - - - −1" applicable to 1×2n pixels on the picked-up image, as explained with reference to FIG. 4B. It is now assumed that the image filter 2 is applied to the region entirely involving the dark lane mark M'.

The left edge of the dark lane mark M' is positioned left in the image filter 2 and the right edge of the dark lane mark M' is positioned right in the image filter 2. Thus, based on the picture being processed by the image filter 1, the positive output value corresponding to the left edge of the dark lane mark M' is multiplied with the positive filtering parameter (+1) of the image filter 2, producing a positive large value. The negative output value corresponding to the right edge of the dark lane mark M' is multiplied with the negative filtering parameter (−1) of the image filter 2, producing a positive large value. As a result, the image filter 2 produces a sum of positive values representing the angular momentum (refer to FIG. 17C) caused in the clockwise direction about the center (i.e., objective pixel) of the image filter 2. Thus, the output of the image filter 2 takes a positive peak value (i.e., maximum angular momentum) at the center of the dark lane mark M' as shown in FIG. 17D.

FIG. 17E shows a pixel value (absolute value) distribution along the scanning line X-Y obtained after the image filter 3 is applied to the picture of FIG. 17C.

The image filter 3 consists of 2n positive filtering parameters, i.e., "1 - - - ,1" applicable to 1×2n pixels on the picked-up image, as explained with reference to FIG. 4C. It is now assumed that the image filter 3 is applied to the region entirely involving the dark lane mark M'.

In this case, the left edge of the dark lane mark M' is positioned left in the image filter 3 and the right edge of the dark lane mark M' is positioned right in the image filter 3.

Thus, based on the picture being processed by the image filter 1, the output value of the image filter 1 is multiplied with +1 (i.e., the filtering parameter of the image filter 3). The image filter 1 produces a positive output in response to the left edge of the dark lane mark M' and a negative output in response to the right edge of the dark lane mark M'. These positive and negative outputs are canceled each other when summed up as an output of the image filter 3. The output of the image filter 3 is 0 at the center of the dark lane mark M' (refer to FIG. 17E).

The image filter 3 produces a positive output in the left region of the scanning line X-Y because the image filter 1 produces a positive peak value at left edge of the dark lane mark M'. The image filter 3 produces a negative output in the right region of the scanning line X-Y because the image filter 1 produces a negative peak value at right edge of the dark lane mark M' as shown by a dotted line in FIG. 17E.

The output of the image filter 3 is subsequently converted into an absolute value as indicated by a solid line in FIG. 17E.

FIG. 17F shows a pixel value (differential value) distribution along the scanning line X-Y which is obtained by subtracting the output of the image filter 2 (i.e., angular momentum of the pixel values) by the absolute value of the output of the image filter 3 (i.e., accumulative absolute value of the pixel values).

As apparent from FIG. 17F, the resultant differential value produces a large positive value at the region corresponding to the dark lane mark M'. This differential value is a good index representing the features of the dark lane mark M'. Thus, the dark lane mark M' can be surely detected by setting the positive threshold Th as shown in FIG. 17F.

The second method is explained.

Figure 18A:
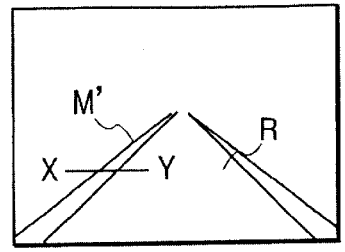
FIGS. 18A to 18F are an original picture and graphs illustrating another filtering procedure using the image filters 1 to 3 to detect the dark lane mark (true mark) in accordance with the preferred embodiment of the present invention.

FIG. 18A shows the original picked-up picture identical with FIG. 17A.

Figure 18B:
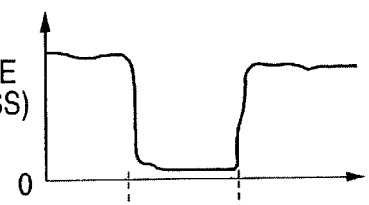

FIG. 18B shows the pixel value (i.e., brightness) distribution along the scanning line X-Y which is also identical with FIG. 17B.

Figure 18C:
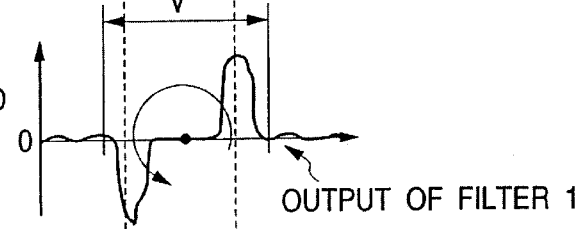

FIG. 18C shows a pixel value (i.e., brightness change) distribution along the scanning line X-Y obtained after the image filter 1 is applied to the original image of FIG. 18A.

According to the second method, the image filter 1 of FIG. 4A is used.

In the scanning direction from left to right, the output signal of the image filter 1 starts decreasing when the scanning point approaches the dark lane mark M', and has a large negative peak value at a portion corresponding to the left edge of the dark lane mark M'. Then, the output signal of the image filter 1 stays at a low (0) level when the scanning point is entirely on the dark lane mark M'. Then, the output signal of the image filter 1 starts increasing when the scanning point approaches the road R, and has a large positive peak value at a portion corresponding to the right edge of the dark lane mark M'. Then, the output signal of the image filter 1 stays at a low (0) level when the scanning point is entirely on the road R. Thus, the image filter 1 produces a pair of negative and positive peak values spaced from each other in the region "V" corresponding to the dark lane mark M'.

Figure 18D:
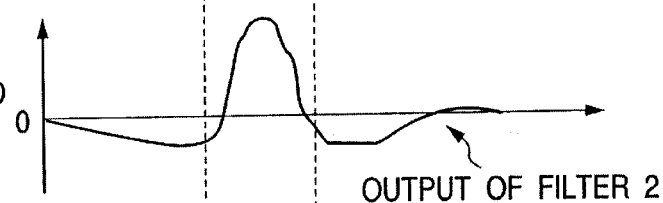

FIG. 18D shows a pixel value (i.e., angular momentum) distribution along the scanning line X-Y obtained after the image filter 2 is applied to the picture of FIG. 18C.

According to the second method, the image filter 2 of FIG. 4B is replaced by the image filter 2 shown in FIG. 4N which consists of n negative filtering parameters (−1) and n positive filtering parameters (+1), i.e., "−1, - - - −1, 1, - - - , 1" applicable to 1×2n pixels on the picked-up image. It is now assumed that the image filter 2 (FIG. 4N) is applied to the region entirely involving the dark lane mark M'.

The left edge of the dark lane mark M' is positioned left in the image filter 2 and the right edge of the dark lane mark M' is positioned right in the image filter 2. Thus, based on the picture being processed by the image filter 1, the negative output value corresponding to the left edge of the dark lane mark M' is multiplied with the negative filtering parameter (−1) of the image filter 2, producing a positive large value. The positive output value corresponding to the right edge of the dark lane mark M' is multiplied with the positive filtering parameter (+1) of the image filter 2, producing a positive large value. As a result, the image filter 2 produces a sum of positive values representing the angular momentum (refer to FIG. 18C) caused in the counterclockwise direction about the center (i.e., objective pixel) of the image filter 2. Thus, the output of the image filter 2 takes a positive peak value (i.e., maximum angular momentum) at the center of the dark lane mark M' as shown in FIG. 18D.

Figure 18E:
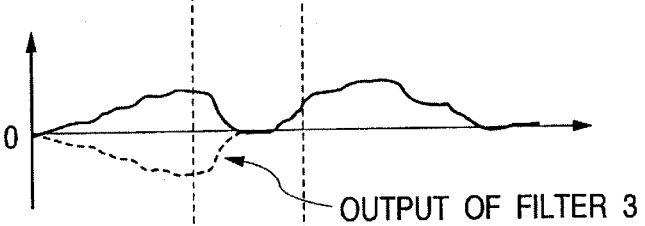

FIG. 18E shows a pixel value (absolute value) distribution along the scanning line X-Y obtained after the image filter 3 is applied to the picture of FIG. 18C.

The image filter 3 consists of 2n positive filtering parameters, i.e., "1, - - - ,1" applicable to 1×2n pixels on the picked-up image, as explained with reference to FIG. 4C. It is now assumed that the image filter 3 is applied to the region entirely involving the dark lane mark M'.

In this case, the left edge of the dark lane mark M' is positioned left in the image filter 3 and the right edge of the dark lane mark M' is positioned right in the image filter 3. Thus, based on the picture being processed by the image filter 1, the output value of the image filter 1 is multiplied with +1 (i.e., the filtering parameter of the image filter 3). The image filter 1 produces a negative output in response to the left edge of the dark lane mark M' and a positive output in response to the right edge of the dark lane mark M'. These positive and negative outputs are canceled each other when summed up as an output of the image filter 3. The output of the image filter 3 is 0 at the center of the dark lane mark M' (refer to FIG. 18E).

The image filter 3 produces a negative output in the left region of the scanning line X-Y because the image filter 1 produces a negative peak value at left edge of the dark lane mark M'. The image filter 3 produces a positive output in the right region of the scanning line X-Y because the image filter 1 produces a positive peak value at right edge of the dark lane mark M' as shown by a dotted line in FIG. 18E.

The output of the image filter 3 is subsequently converted into an absolute value as indicated by a solid line in FIG. 18E.

Figure 18F:
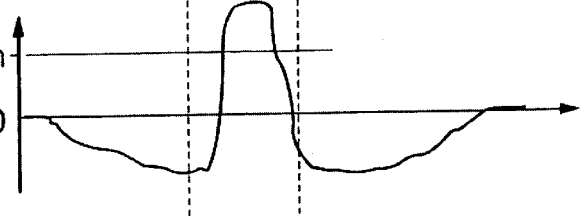

FIG. 18F shows a pixel value (differential value) distribution along the scanning line X-Y which is obtained by subtracting the output of the image filter 2 (i.e., angular momentum of the pixel values) by the absolute value of the output of the image filter 3 (i.e., accumulative absolute value of the pixel values).

As apparent from FIG. 18F, the resultant differential value produces a large positive value at the region corresponding to the dark lane mark M'. This differential value is a good index representing the features of the dark lane mark M'. Thus, the dark lane mark M' can be surely detected by setting the positive threshold Th as shown in FIG. 18F.

In the same manner, the bright lane mark (true lane mark) can be detected by using a different combination of the image filters.

Figure 19A:
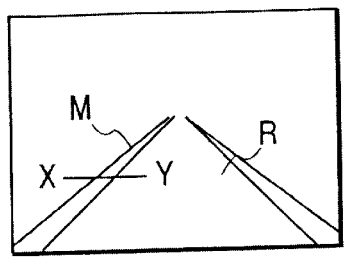
FIGS. 19A to 19F are an original picture and graphs illustrating another filtering procedure using the image filters 1 to 3 to detect the bright lane mark (true mark) in accordance with the preferred embodiment of the present invention.

FIG. 19A shows the original picked-up picture identical with FIG. 6A.

Figure 19B:
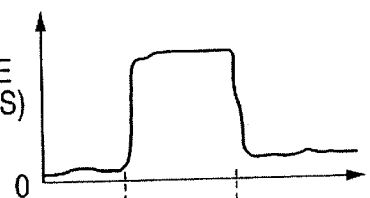

FIG. 19B shows the pixel value (i.e., brightness) distribution along the scanning line X-Y which is also identical with FIG. 6B.

Figure 19C:
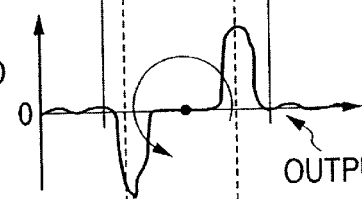

FIG. 19C shows a pixel value (i.e., brightness change) distribution along the scanning line X-Y obtained after the image filter 1 is applied to the original image of FIG. 19A.

In this case, the image filter 1 of FIG. 4A is replaced by the image filter 1 shown in FIG. 4E.

In the scanning direction from left to right, the output signal of the image filter 1 starts decreasing when the scanning point approaches the bright lane mark M, and has a large negative peak value at a portion corresponding to the left edge of the bright lane mark M. Then, the output signal of the image filter 1 stays at a low (0) level when the scanning point is entirely on the bright lane mark M. Then, the output signal of the image filter 1 starts increasing when the scanning point approaches the road R, and has a large positive peak value at a portion corresponding to the right edge of the bright lane mark M. Then, the output signal of the image filter 1 stays at a low (0) level when the scanning point is entirely on the road R. Thus, the image filter 1 produces a pair of negative and positive peak values spaced from each other in the region "V" corresponding to the bright lane mark M.

Figure 19D:
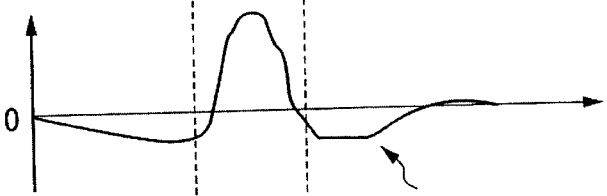

FIG. 19D shows a pixel value (i.e., angular momentum) distribution along the scanning line X-Y obtained after the image filter 2 is applied to the picture of FIG. 19C.

According to this method, the image filter 2 of FIG. 4B is replaced by the image filter 2 shown in FIG. 4N which consists of n negative filtering parameters (−1) and n positive filtering parameters (+1), i.e., "−1, - - - −1, 1, - - - , 1" applicable to 1×2n pixels on the picked-up image. It is now assumed that the image filter 2 (FIG. 4N) is applied to the region entirely involving the bright lane mark M.

The left edge of the bright lane mark M is positioned left in the image filter 2 and the right edge of the bright lane mark M is positioned right in the image filter 2. Thus, based on the picture being processed by the image filter 1, the negative output value corresponding to the left edge of the bright lane mark M is multiplied with the negative filtering parameter (−1) of the image filter 2, producing a positive large value. The positive output value corresponding to the right edge of the bright lane mark M is multiplied with the positive filtering parameter (+1) of the image filter 2, producing a positive large value. As a result, the image filter 2 produces a sum of positive values representing the angular momentum (refer to FIG. 19C) caused in the counterclockwise direction about the center (i.e., objective pixel) of the image filter 2. Thus, the output of the image filter 2 takes a positive peak value (i.e., maximum angular momentum) at the center of the bright lane mark M as shown in FIG. 19D.

Figure 19E:
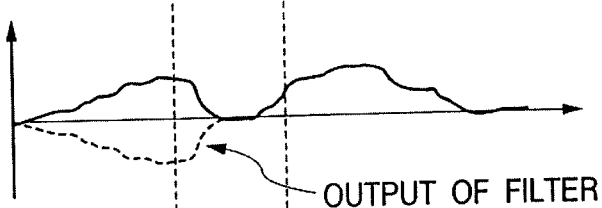

FIG. 19E shows a pixel value (absolute value) distribution along the scanning line X-Y obtained after the image filter 3 is applied to the picture of FIG. 19C.

The image filter 3 consists of 2n positive filtering parameters, i.e., "1, - - - ,1" applicable to 1×2n pixels on the picked-up image, as explained with reference to FIG. 4C. It is now assumed that the image filter 3 is applied to the region entirely involving the bright lane mark M.

In this case, the left edge of the bright lane mark M is positioned left in the image filter 3 and the right edge of the bright lane mark M is positioned right in the image filter 3. Thus, based on the picture being processed by the image filter 1, the output value of the image filter 1 is multiplied with +1 (i.e., the filtering parameter of the image filter 3). The image filter 1 produces a negative output in response to the left edge of the bright lane mark M and a positive output in response to the right edge of the bright lane mark M. These positive and negative outputs are canceled each other when summed up as an output of the image filter 3. The output of the image filter 3 is 0 at the center of the bright lane mark M (refer to FIG. 19E).

The image filter 3 produces a negative output in the left region of the scanning line X-Y because the image filter 1 produces a negative peak value at left edge of the bright lane mark M. The image filter 3 produces a positive output in the right region of the scanning line X-Y because the image filter 1 produces a positive peak value at right edge of the bright lane mark M as shown by a dotted line in FIG. 19E.

The output of the image filter 3 is subsequently converted into an absolute value as indicated by a solid line in FIG. 19E.

Figure 19F:
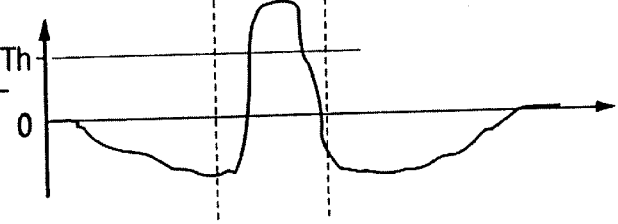

FIG. 19F shows a pixel value (differential value) distribution along the scanning line X-Y which is obtained by subtracting the output of the image filter 2 (i.e., angular momentum of the pixel values) by the absolute value of the output of the image filter 3 (i.e., accumulative absolute value of the pixel values).

As apparent from FIG. 19F, the resultant differential value produces a large positive value at the region corresponding to the bright lane mark M. This differential value is a good index representing the features of the bright lane mark M. Thus, the bright lane mark M can be surely detected by setting the positive threshold Th as shown in FIG. 19F.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A picked-up image preprocessing apparatus for applying predetermined preprocessing to a picked-up image of a traveling road ahead of a vehicle and installable in a lane mark recognizing apparatus for recognizing a lane mark on the traveling road based on the picked-up image, said picked-up image preprocessing apparatus comprising:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than said lane mark, said lane feature quantity corresponding to a difference between an angular momentum of respective pixels about a central pixel in said predetermined processing zone and an accumulative absolute value of said respective pixels in said predetermined processing zone, said angular momentum being defined by vectorial quantities of pixel values of said respective pixels relative to said central pixel.

2. The picked-up image preprocessing apparatus in accordance with claim 1, wherein said lane mark is a bright portion in said picked-up image;

said emphasized output of said image emphasizing means is positive when said brightness change occurs in a transition from the dark portion to the bright portion and is negative when said brightness change occurs in an opposed transition from the bright portion to the dark portion, and said angular momentum of said respective pixels is positive when said angular momentum is detected in a clockwise direction relative to said central pixel in said predetermined processing zone.

3. The picked-up image preprocessing apparatus in accordance with claim 1, wherein said lane mark is a dark portion in said picked-up image;

said emphasized output of said image emphasizing means is positive when said brightness change occurs in a transition from the bright portion to the dark portion and is negative when said brightness change occurs in an opposed transition from the dark portion to the bright portion, and said angular momentum of said respective pixels is positive when said angular momentum is detected in a clockwise direction relative to said central pixel in said predetermined processing zone.

4. The picked-up image preprocessing apparatus in accordance with claim 1, wherein said lane mark is a dark portion in said picked-up image;

said emphasized output of said image emphasizing means is negative when said brightness change occurs in a transition from the bright portion to the dark portion and is positive when said brightness change occurs in an opposed transition from the dark portion to the bright portion, and said angular momentum of said respective pixels is positive when said angular momentum is detected in a counterclockwise direction relative to said central pixel in said predetermined processing zone.

5. The picked-up image preprocessing apparatus in accordance with claim 1, wherein said lane mark is a bright portion in said picked-up image;

said emphasized output of said image emphasizing means is negative when said brightness change occurs in a transition from the dark portion to the bright portion and is positive when said brightness change occurs in an opposed transition from the bright portion to the dark portion, and said angular momentum of said respective pixels is positive when said angular momentum is detected in a counterclockwise direction relative to said central pixel in said predetermined processing zone.

6. The picked-up image preprocessing apparatus in accordance with claim 1, wherein said predetermined processing zone has a dead zone with a predetermined width at a center thereof so that said angular momentum and said accumulative absolute value are not obtained from said dead zone.

7. The picked-up image preprocessing apparatus in accordance with claim 6, wherein said dead zone has a width widened at a lower side of said picked-up image and narrowed at an upper side of said picked-up image.

8. The picked-up image preprocessing apparatus in accordance with claim 7, wherein said width of said dead zone is determined based on a perspective transformation applied to said picked-up image.

9. The picked-up image preprocessing apparatus in accordance with claim 8, wherein said predetermined upper region including no lane mark is regarded as a region higher than an infinite position of said lane mark on said picked-up image.

10. The picked-up image preprocessing apparatus in accordance with claim 1, wherein said predetermined processing zone has a width widened at a lower side of said picked-up image and narrowed at an upper side of said picked-up image.

11. The picked-up image preprocessing apparatus in accordance with claim 10, wherein said width of said predetermined processing zone is determined based on a perspective transformation applied to said picked-up image.

12. The picked-up image preprocessing apparatus in accordance with 1, wherein said width of said predetermined processing zone is set to zero at a predetermined upper region of said picked-up image where no lane mark is present.

13. The picked-up image preprocessing apparatus in accordance with claim 1, wherein said predetermined processing zone extends in a horizontal direction of said picked-up image.

14. The picked-up image preprocessing apparatus in accordance with claim 1, wherein said predetermined processing zone is extendable in a vertical direction of said picked-up image as well as in a horizontal direction of said picked-up image.

15. The picked-up image preprocessing apparatus in accordance with claim 1, wherein said predetermined processing zone is set along a direction normal to said lane mark on said picked-up image.

16. The picked-up image preprocessing apparatus in accordance with claim 15, wherein said predetermined processing zone is set based on a previously detected position of said lane mark in a lane mark recognizing apparatus with which said picked-up image preprocessing apparatus is incorporated.

17. A picked-up image preprocessing apparatus for applying predetermined preprocessing to a picked-up image of a traveling road ahead of a vehicle and installable in a lane mark recognizing apparatus for recognizing a lane mark on the traveling road based on the picked-up image, said picked-up image preprocessing apparatus comprising:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than said lane mark, said image output means comprising:

first detecting means for detecting a symmetrical disposition of positive and negative pixel values of respective pixels about a central pixel in said predetermined processing zone; and second detecting means for obtaining an accumulative absolute value of said respective pixels in said predetermined processing zone, so that an output difference between said first detecting means and said second detecting means is obtained as said lane feature quantity.

18. A lane mark recognizing system comprising a picked-up image preprocessing apparatus and a lane mark recognizing apparatus, wherein said picked-up image preprocessing apparatus applies predetermined preprocessing to a picked-up image of a traveling road ahead of a vehicle, said picked-up image preprocessing apparatus comprises:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than a lane mark, said image output means comprises:

angular momentum detecting means for obtaining an angular momentum of respective pixels about a central pixel in said predetermined processing zone, said angular momentum being defined by vectorial quantities of pixel values of said respective pixels relative to said central pixel; and absolute value detecting means for obtaining an accumulative absolute value of said respective pixels in said predetermined processing zone, so that a difference between said angular momentum obtained by said angular momentum detecting means and said accumulative absolute value obtained by said absolute value detecting means is obtained as said lane feature quantity, and said lane mark recognizing apparatus recognizes the lane mark based on the lane feature quantity obtained by said image output means of said picked-up image preprocessing apparatus.

19. A vehicle traveling control system comprising a picked-up image preprocessing apparatus, a lane mark recognizing apparatus, and a vehicle traveling control apparatus, wherein said picked-up image preprocessing apparatus applies predetermined preprocessing to a picked-up image of a traveling road ahead of a vehicle, said picked-up image preprocessing apparatus comprises:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than a lane mark, said image output means comprises:

angular momentum detecting means for obtaining an angular momentum of respective pixels about a central pixel in said predetermined processing zone, said angular momentum being defined by vectorial quantities of pixel values of said respective pixels relative to said central pixel; and absolute value detecting means for obtaining an accumulative absolute value of said respective pixels in said predetermined processing zone, so that a difference between said angular momentum obtained by said angular momentum detecting means and said accumulative absolute value obtained by said absolute value detecting means is obtained as said lane feature quantity, said lane mark recognizing apparatus recognizes the lane mark based on the lane feature quantity obtained by said image output means of said picked-up image preprocessing apparatus, and said vehicle traveling control apparatus controls the traveling of said vehicle according to the lane mark recognized by said lane mark recognizing apparatus.

20. A recording medium storing a program of a computer system, said program being used for applying predetermined preprocessing to a picked-up image of a traveling road ahead of a vehicle to recognize a lane mark on the traveling road based on the picked-up image, said predetermined preprocessing comprises the steps of:

scanning the picked-up image and generating an emphasized output responsive to a brightness change between a dark portion and a bright portion of the picked-up image, with a sign of said emphasized output reversing according to a transitional direction of the brightness change between the dark portion and the bright portion;

setting a predetermined processing zone on said picked-up image, said processing zone having a size applicable to a plurality of pixels of said picked-up image with a width wider than said lane mark, obtaining an angular momentum of respective pixels about a central pixel in said predetermined processing zone, said angular momentum being defined by vectorial quantities of pixel values of said respective pixels relative to said central pixel;

obtaining an accumulative absolute value of said respective pixels in said predetermined processing zone, and producing a picture containing a lane feature quantity, said lane feature quantity corresponding to a difference between said angular momentum and said accumulative absolute value of said respective pixels.

21. A lane mark recognizing system comprising a picked-up image preprocessing apparatus and a lane mark recognizing apparatus, wherein said picked-up image preprocessing apparatus applies predetermined preprocessing to a picked-up image of a traveling road ahead of a vehicle, said picked-up image preprocessing apparatus comprises:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than a lane mark, said image output means comprising:

first detecting means for detecting a symmetrical disposition of positive and negative pixel values of respective pixels about a central pixel in said predetermined processing zone; and second detecting means for obtaining an accumulative absolute value of said respective pixels in said predetermined processing zone, so that an output difference between said first detecting means and said second detecting means is obtained as said lane feature quantity, and said lane mark recognizing apparatus recognizes the lane mark based on the lane feature quantity obtained by said image output means of said picked-up image preprocessing apparatus.

22. A vehicle traveling control system comprising a picked-up image preprocessing apparatus, a lane mark recognizing apparatus, and a vehicle traveling control apparatus, wherein said picked-up image preprocessing apparatus applies predetermined preprocessing to a picked-up image of a traveling road ahead of a vehicle, said picked-up image preprocessing apparatus comprises:

image emphasizing means for scanning the picked-up image and generating an emphasized output responsive to a brightness change between a dark portion and a bright portion of the picked-up image, with a sign of said emphasized output reversing according to a transitional direction of the brightness change between the dark portion and the bright portion; and image output means for producing a picture resultant from said emphasized output of said image emphasizing means, said picture containing a lane feature quantity obtained in a predetermined processing zone set on said picked-up image, said processing zone having a size applicable to a plurality of pixels of said picked-up image with a width wider than a lane mark, said image output means comprises:

first detecting means for detecting a symmetrical disposition of positive and negative pixel values of respective pixels about a central pixel in said predetermined processing zone; and second detecting means for obtaining an accumulative absolute value of said respective pixels in said predetermined processing zone, so that an output difference between said first detecting means and said second detecting means is obtained as said lane feature quantity, said lane mark recognizing apparatus recognizes the lane mark based on the lane feature quantity obtained by said image output means of said picked-up image preprocessing apparatus, and said vehicle traveling control apparatus controls the traveling of said vehicle according to the lane mark recognized by said lane mark recognizing apparatus.

23. A picked-up image preprocessing apparatus for applying predetermined preprocessing to a picked-up image of a traveling road ahead of a vehicle and installable in a lane mark recognizing apparatus for recognizing a lane mark on the traveling road based on the picked-up image, said picked-up image preprocessing apparatus comprising:

a first image filter having filtering parameters arranged in a matrix pattern applicable to a plurality of pixels on said picked-up image for producing an emphasized output responsive to a brightness change between a dark portion and a bright portion of the picked-up image, with a sign of said emphasized output reversing according to a transitional direction of the brightness change between the dark portion and the bright portion;

a second image filter having filtering parameters having a predetermined processing zone applicable to a plurality of pixels on said picked-up image for producing an output representing an angular momentum of respective pixels about a central pixel of said predetermined processing zone, said angular momentum being defined by vectorial quantities of pixel values of said respective pixels relative to said central pixel;

a third image filter having filtering parameters having a predetermined processing zone applicable to a plurality of pixels on said picked-up image for producing an output representing an accumulative absolute value of respective pixels about a central pixel of said predetermined processing zone; and feature quantity detecting means for detecting a lane feature quantity corresponding to a difference between the output of said second image filter and the output of said third image filter.

24. The picked-up image preprocessing apparatus in accordance with claim 23, wherein the predetermined processing zone of said second image filter is identical with the predetermined processing zone of said third image filter.

25. The picked-up image preprocessing apparatus in accordance with claim 23, wherein said predetermined processing zone of said second image filter and said predetermined processing zone of said third image filter are wider than said lane mark.

26. The picked-up image preprocessing apparatus in accordance with claim 23, wherein said lane mark is brighter than said road, the first image filter produces a positive emphasized output in response to a brightness change occurring in a transition from the dark portion to the bright portion and produces a negative emphasized output in response to a brightness change occurring in an opposed transition from the bright portion to the dark portion, and the second image filter produces a positive value when the angular momentum is obtained in a clockwise direction.

27. The picked-up image preprocessing apparatus in accordance with claim 23, wherein said lane mark is darker than said road, the first image filter produces a positive emphasized output in response to a brightness change occurring in a transition from the bright portion to the dark portion and produces a negative emphasized output in response to a brightness change occurring in an opposed transition from the dark portion to the bright portion, and the second image filter produces a positive value when the angular momentum is obtained in a clockwise direction.

28. The picked-up image preprocessing apparatus in accordance with claim 23, wherein said lane mark is darker than said road, the first image filter produces a negative emphasized output in response to a brightness change occurring in a transition from the bright portion to the dark portion and produces a positive emphasized output in response to a brightness change occurring in an opposed transition from the dark portion to the bright portion, and the second image filter produces a positive value when the angular momentum is obtained in a counterclockwise direction.

29. The picked-up image preprocessing apparatus in accordance with claim 23, wherein said lane mark is brighter than said road, the first image filter produces a negative emphasized output in response to a brightness change occurring in a transition from the dark portion to the bright portion and produces a positive emphasized output in response to a brightness change occurring in an opposed transition from the bright portion to the dark portion, and the second image filter produces a positive value when the angular momentum is obtained in a counterclockwise direction.

30. The picked-up image preprocessing apparatus in accordance with claim 23, wherein said second and third image filters have a dead zone with a predetermined width at a center thereof so that said angular momentum and said accumulative absolute value are not obtained from said dead zone.

31. A picked-up image preprocessing apparatus for applying predetermined preprocessing to a picked-up image of a traveling road ahead of a vehicle and installable in a lane mark recognizing apparatus for recognizing a lane mark on the traveling road based on the picked-up image, said picked-up image preprocessing apparatus comprising:

an angular momentum filter having filtering parameters having a predetermined processing zone applicable to a plurality of pixels on said picked-up image for producing an output representing an angular momentum of respective pixels about a central pixel of said predetermined processing zone, said angular momentum being defined by vectorial quantities of pixel values of said respective pixels relative to said central pixel;

an accumulative absolute value filter having filtering parameters having a predetermined processing zone applicable to a plurality of pixels on said picked-up image for producing an output representing an accumulative absolute value of respective pixels about a central pixel of said predetermined processing zone; and feature quantity detecting means for detecting a lane feature quantity corresponding to a difference between the output of said angular momentum filter and the output of said accumulative absolute value filter.

32. The picked-up image preprocessing apparatus in accordance with claim 31, wherein said angular momentum filter and said accumulative absolute value filter have a dead zone with a predetermined width at a center thereof so that said angular momentum and said accumulative absolute value are not obtained from said dead zone.

33. A method for applying predetermined preprocessing to a picked-up image of a traveling road ahead of a vehicle to recognize a lane mark on the traveling road based on the picked-up image, said predetermined preprocessing comprising the steps of:

generating an emphasized output responsive to a brightness change between a dark portion and a bright portion of the picked-up image, with a sign of said emphasized output reversing according to a transitional direction of the brightness change between the dark portion and the bright portion;

setting a predetermined processing zone on said picked-up image, said processing zone having a size applicable to a plurality of pixels of said picked-up image with a width wider than said lane mark, obtaining an angular momentum of respective pixels about a central pixel in said predetermined processing zone, said angular momentum being defined by vectorial quantities of pixel values of said respective pixels relative to said central pixel;

obtaining an accumulative absolute value of said respective pixels in said predetermined processing zone, and producing a picture containing a lane feature quantity, said lane feature quantity corresponding to a difference between said angular momentum and said accumulative absolute value of said respective pixels.

34. A method for applying predetermined preprocessing to a picked-up image of a traveling road ahead of a vehicle to recognize a lane mark on the traveling road based on the picked-up image, said predetermined preprocessing comprising the steps of:

applying a first image filter to said picked-up image for producing an emphasized output responsive to a brightness change between a dark portion and a bright portion of the picked-up image, with a sign of said emphasized output reversing according to a transitional direction of the brightness change between the dark portion and the bright portion, said first image filter having filtering parameters arranged in a matrix pattern applicable to a plurality of pixels on said picked-up image;

applying a second image filter with a predetermined processing zone to the emphasized output of said first image filter for producing an output representing an angular momentum of respective pixels about a central pixel of said predetermined processing zone, said angular momentum being defined by vectorial quantities of pixel values of said respective pixels relative to said central pixel;

applying a third image filter with a predetermined processing zone to the emphasized output of said first image filter for producing an output representing an accumulative absolute value of respective pixels about a central pixel of said predetermined processing zone; and detecting a lane feature quantity corresponding to a difference between the output of said second image filter and the output of said third image filter.

35. A method for applying predetermined preprocessing to a picked-up image of a traveling road ahead of a vehicle to recognize a lane mark on the traveling road based on the picked-up image, said predetermined preprocessing comprising the steps of:

applying an angular momentum filter with a predetermined processing zone to pixels of said picked-up image for producing an output representing an angular momentum of respective pixels about a central pixel of said predetermined processing zone, said angular momentum being defined by vectorial quantities of pixel values of said respective pixels relative to said central pixel;

applying an accumulative absolute value filter with a predetermined processing zone to pixels of said picked-up image for producing an output representing an accumulative absolute value of respective pixels about a central pixel of said predetermined processing zone; and detecting a lane feature quantity corresponding to a difference between the output of said angular momentum filter and the output of said accumulative absolute value filter.

* * * * *

UNITED STATES PATENT AND TRADEMARK OFFICE
CERTIFICATE OF CORRECTION

PATENT NO. : 6,591,000 B1
DATED : July 8, 2003
INVENTOR(S) : Tatsuya Oike et al.

It is certified that error appears in the above-identified patent and that said Letters Patent is hereby corrected as shown below:

<u>Column 36,</u>
Line 14, after "with" insert -- claim --

Signed and Sealed this

Fourteenth Day of October, 2003

JAMES E. ROGAN
*Director of the United States Patent and Trademark Office*